US 6,547,189 B1

(12) United States Patent
Raboin et al.

(10) Patent No.: US 6,547,189 B1
(45) Date of Patent: Apr. 15, 2003

(54) INFLATABLE VESSEL AND METHOD

(75) Inventors: Jasen L. Raboin, League City, TX (US); Gerard D. Valle, Pearland, TX (US); Gregg A. Edeen, Friendswood, TX (US); Horacio M. de la Fuente, Friendswood, TX (US); William C. Schneider, Houston, TX (US); Gary R. Spexarth, Houston, TX (US); Shalini Gupta Pandya, Ithaca, NY (US); Christopher J. Johnson, Houston, TX (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 54 days.

(21) Appl. No.: 09/826,403

(22) Filed: Apr. 2, 2001

Related U.S. Application Data

(63) Continuation-in-part of application No. 09/236,785, filed on Jan. 25, 1999, now Pat. No. 6,231,010.
(60) Provisional application No. 60/217,325, filed on Jun. 28, 2000.

(51) Int. Cl.⁷ ................................................. B64G 1/12
(52) U.S. Cl. ........................................ 244/159; 52/2.11
(58) Field of Search ............................ 244/158 R, 159, 244/173; 52/2.11, 2.19; 428/71

(56) References Cited

U.S. PATENT DOCUMENTS

| | | | |
|---|---|---|---|
| 3,144,219 A | 8/1964 | Schnitzer | 244/1 |
| 3,169,725 A | 2/1965 | Berglund | 244/1 |
| 3,210,026 A | * 10/1965 | Frisch | 244/159 |
| 3,364,631 A | * 1/1968 | Pleasants | 244/173 X |
| 4,730,797 A | 3/1988 | Minovitch | 244/159 |
| 4,792,108 A | 12/1988 | Bull | 244/159 |
| 4,825,599 A | 5/1989 | Swann, Jr. | 52/2 |
| 4,964,597 A | * 10/1990 | Hijazi | 244/159 |
| 5,094,409 A | * 3/1992 | King et al. | 244/159 X |
| 5,429,851 A | 7/1995 | Sallee | 428/71 |
| 5,580,013 A | 12/1996 | Velke | 244/159 |

* cited by examiner

Primary Examiner—Robert P. Swiatek
(74) Attorney, Agent, or Firm—Theodore U. Ro

(57) ABSTRACT

An inflatable module comprising a structural core and an inflatable shell, wherein the inflatable shell is sealingly attached to the structural core. In its launch or pre-deployed configuration, the wall thickness of the inflatable shell is collapsed by vacuum. Also in this configuration, the inflatable shell is collapsed and efficiently folded around the structural core. Upon deployment, the wall thickness of the inflatable shell is inflated; whereby the inflatable shell itself, is thereby inflated around the structural core, defining therein a large enclosed volume. A plurality of removable shelves are arranged interior to the structural core in the launch configuration. The structural core also includes at least one longeron that, in conjunction with the shelves, primarily constitute the rigid, strong, and lightweight load-bearing structure of the module during launch. The removable shelves are detachable from their arrangement in the launch configuration so that, when the module is in its deployed configuration and launch loads no longer exist, the shelves can be rearranged to provide a module interior arrangement suitable for human habitation and work. In the preferred embodiment, to provide efficiency in structural load paths and attachments, the shape of the inflatable shell is a cylinder with semi-toroidal ends.

52 Claims, 21 Drawing Sheets

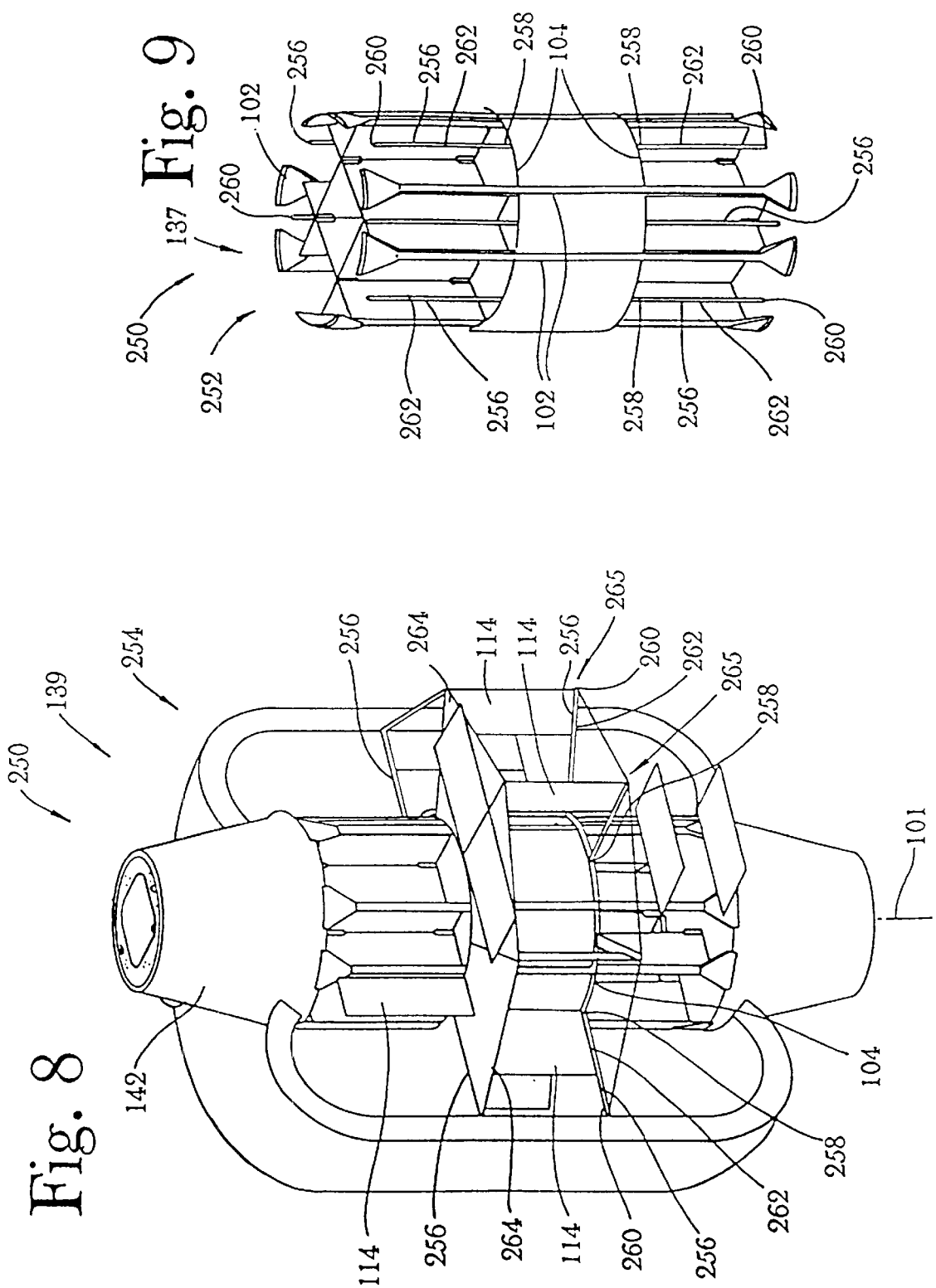

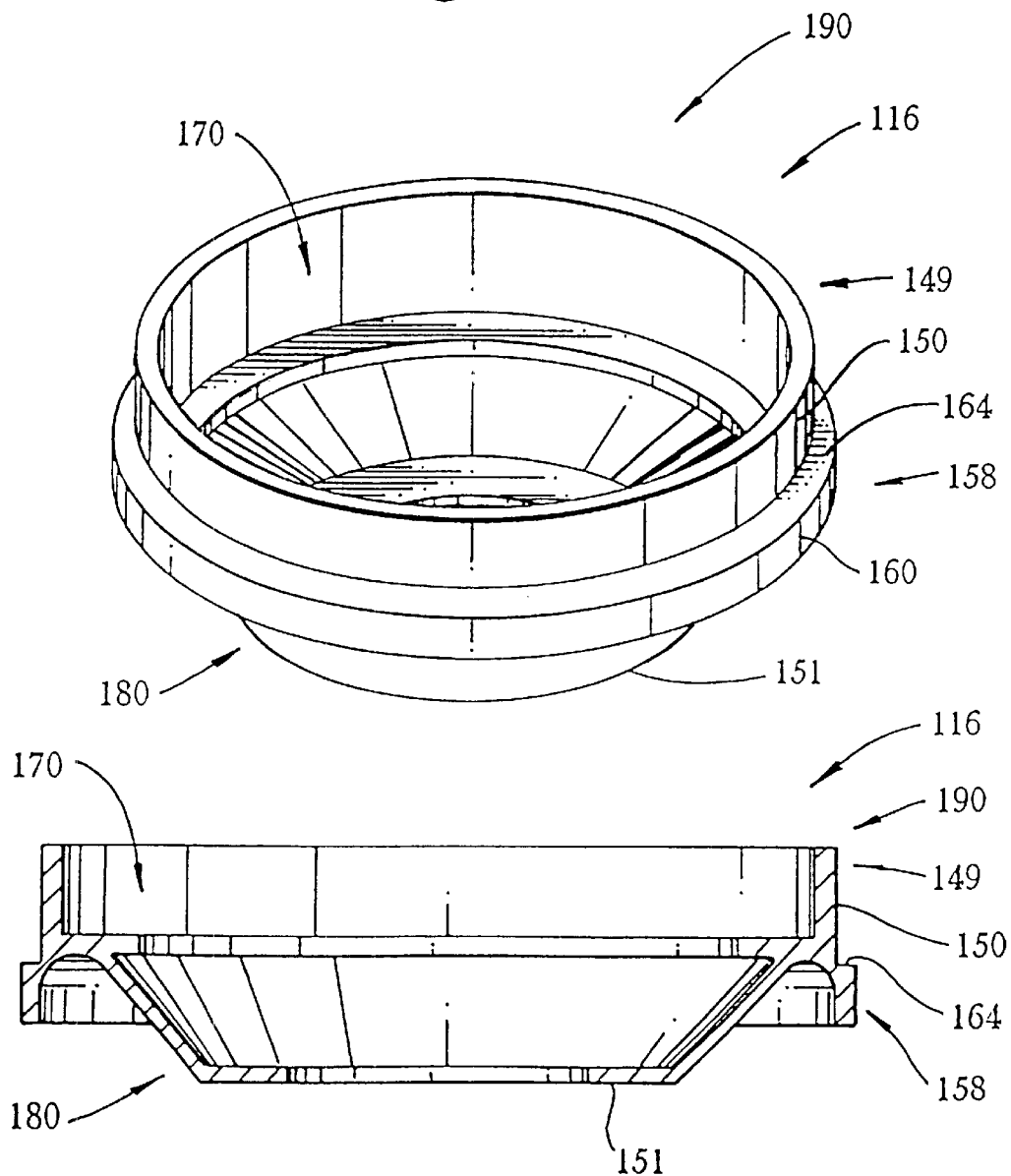

INFLATABLE VESSEL AND METHOD

The invention described herein is a Continuation-in-Part of U.S. application Ser. No. 09/236,785 filed Jan. 25, 1999, now U.S. Pat. No. 6,231,010 B1 and having an the title "Advanced Structural and Inflatable Hybrid Spacecraft Module." This application specifically incorporates by reference the entirety of application Ser. No. 09/236,785, and thereby makes that prior application a part of this application. This application further claims the benefit of U.S. Provisional Application Serial No. 60/217,325 filed Jun. 28, 2000 and entitled "Advanced, Large Volume, Highly Loaded, Hybrid Inflatable Pressure Vessel."

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF THE INVENTION

This invention relates generally to inflatable modules or vessels. In particular, this invention relates to such a module that is lightweight, collapsible and compact prior to deployment, and is capable of being subsequently inflated to provide a relatively large volume for storage, containment, human habitation, shelter, or work, as well as for space flight. This invention also relates to an inflatable module or vessel that may be highly loaded. The benefits of this invention include a vessel having a high strength-to-weight ratio, a minimum volume prior to inflation, high-pressure and/or large volume capability, ease of manufacturing and thus low cost, and an inflated vessel with a relatively low leak rate.

BACKGROUND OF THE INVENTION

In general, modules for use in one location can either (1) be assembled at another location and transported to the location of use or (2) be assembled at the use location with their individual parts being transported from other locations. Each method of assembly has advantages and drawbacks. For example, if a module is to be assembled on earth and thereafter transported into orbit, then the overall size of the module becomes a limiting factor.

Pre-assembled modules, however, do provide certain advantages. For instance, all of the components and system interfaces of a pre-assembled module may be tested, calibrated, and repaired at the manufacturing location where replacement parts and technical expertise are readily available. In addition, a pre-assembled module can be utilized almost immediately once at its use location without having to wait for assembly or testing time.

Like pre-assembled modules, modules assembled on the use site also provide certain advantages. For example, the size and weight of an orbit-assembled module is theoretically unlimited, thereby providing designers with a greater range of design parameters and possibilities.

It would thus be advantageous over the prior art to provide inflatable modules that combine the advantages offered by, and limit some of the drawbacks inherent in, both pre-assembled and site assembled modules.

Space modules are generally known to the prior art. Illustrative of such modules are U.S. Pat. No. 3,169,725 issued to Berglund on Feb. 16, 1965; U.S. Pat. No. 3,144,219 issued to Schnitzer on Aug. 11, 1964; U.S. Pat. No. 4,730,797 issued to Minovitch on Mar. 15, 1988; U.S. Pat. No. 4,792,108 issued to Bull on Dec. 20, 1988; U.S. Pat. No. 4,825,599 issued to Swann, Jr. on May 2, 1989; U.S. Pat. No. 5,350,138 issued to Culbertson et al. on Sep. 27, 1994; U.S. Pat. No. 5,429,851 issued to Sallee on Jul. 4, 1995; and U.S. Pat. No. 5,580,013 issued to Velke on Dec. 3, 1996.

Although most of the listed patents include ingenious structures to be utilized in the outer space environment and some even include expandable components, none of the inventions disclosed in such patents include a structure that is compact during the transport or deployment stage and can thereafter be inflated to provide a fully usable space in the deployed stage.

SUMMARY OF THE INVENTION

Accordingly, the objectives of this invention are to provide, inter alia, a module that:

combines the advantages offered by, and limits the drawbacks inherent in, pressembled assembled and in situ assembled modules;

is lightweight, collapsible and compact prior to and during its transport or pre-deployment stage;

is capable of being subsequently inflated while in its deployed stage to provide a relatively larger volume for storage, containment, human habitation, shelter, or work, as well as for space flight;

minimizes the number of parts to be assembled as well as the amount of work necessary to complete the assembly;

for space-flight, may be launched in existing launch vehicles;

allows for the majority of its components and system interfaces to be tested and calibrated prior to transport and deployment;

for space flight, may be efficiently and easily converted from its structurally efficient launch configuration to its deployed configuration;

is inflatable from its launch or transport configuration to its deployed configuration, thereby providing a relatively larger useable volume; and utilizes a number of key components for multiple functions, thereby providing mass and volume efficiency to the module.

Other objectives of the invention will become apparent from time to time throughout the specification and claims as hereinafter related.

To achieve such objectives, the invention includes a module that generally comprises a structural core and an inflatable shell. The inflatable shell is searingly attached to the structural core. In its pre-deployment or launch configuration, the interior and thickness of the inflatable shell may be collapsed by vacuum. Also in this configuration, the inflatable shell may be efficiently folded around the structural core, and for space flight, the module may be loaded into the payload bay of an existing launch vehicle, such as the Space Shuttle. On location, in orbit for example, the module is deployed, the inflatable shell is inflated, and the module achieves its deployed configuration. In its deployed configuration, the thickness of the inflatable shell automatically expands from its collapsed state to its full thickness, and the inflatable shell is inflated around the structural core, defining therein a large volume useable, for example, as habitable space for astronauts. A plurality of removable shelves may be arranged interior to the structural core in the pre-deployment or launch configuration. The structural core may also include at least one longeron that, in conjunction with the shelves, primarily constitute the rigid, strong, and lightweight load-bearing structure of the module during transport or launch. The removable shelves are detachable from their arrangement in the transport or launch configuration so that, when the module is in its deployed configuration and transport or launch loads no longer exist, the shelves may be rearranged to provide a module interior arrangement suitable for example, for human habitation and work. In the preferred embodiment, to provide efficiency in structural load paths and attachments, the shape of the inflatable shell is a cylinder with semi-toroidal ends in its deployed configuration.

In a preferred embodiment, the inflatable shell of the module consists of four primary components: the inner liner, bladder, restraint layer and seal interface. Alternate embodiments may not have an inner liner or seal interface, but will most likely still have a structural restraint layer and bladder. In some cases, the bladder and restraint layer may be incorporated as one unit.

The module according to the present invention may include a flexible restraint layer that is capable of taking a large load, and this feature is incorporated in the preferred design. The module may transition from a flexible restraint layer to a rigid structure to allow for airlocks, entry hatches, windows, or inflation monitoring ports. Especially for space applications but also for other applications, the inflated module has a relatively low leak rate.

Further objectives of this invention are to provide, inter alia, an inflatable highly loaded pressure vessel that:

is lightweight (when compared to conventional pressure vessels of equal size and pressure capability;

is capable of carrying a large load due to high pressure and/or large volume;

may be efficiently packaged prior to deployment/inflation;

due to its lower weight is easier to transport prior to inflation;

is capable of being inflated at its desired locations;

minimizes assembly time and parts;

is easy to manufacture by reducing the part count and assembly time (when compared to conventional pressure vessels of equal size and pressure capability);

is relatively low cost due to the ease in manufacturing; and has a low permeability rate; and is capable of incorporating an interface between the flexible bladder and load bearing restraint layer and a rigid structural interface such as an airlock, entry hatch, window, and inflation/monitoring ports.

Assorted uses for the inflatable module include a large habitation/storage module for terrestrial, space, or other harsh environment applications, a hyperbolic chamber/airlock, a ballast for ocean fairing vessels, a life boat-type vessel, and a flexible pressure tank.

It is also an object of the invention to provide an inflatable module including one or more rigid structural pass through frames and an inflatable shell. The shell has a pre-deployment configuration in which the shell is collapsed and deflated, and a deployed configuration in which the shell is inflated and defines an interior space. The inflatable shell includes a flexible restraint layer preferably comprising interwoven elongate longitudinal straps and hoop straps. The flexible restraint layer is structurally secured to each of the one or more rigid structural pass through frames, and a bladder is searingly and separately attached to the pass through frames. Longitudinal straps and hoop straps may be connected at selectively spaced intervals by a stitch or other fastening device. Another type of stitch may be used to connect a longitudinal strap with either an end of the same strap or with another longitudinal strap. The spacing between successive rows of the stitch may be varied to increase the strength of the stitch. Two adjacent longitudinal straps may form a single loop which is attached to the longitudinally spaced ends of a structural core of the module. Each end of the single loop preferably is wrapped around a roller secured to the structural core. The bladder may comprise one or more bladder layers. If two or more bladder layers are provided, the bladder layers may be connected by selectively spaced fastening patches that would fail prior to damaging the bladder layers. The bladder or outermost bladder layer may be intermittently secured to the restraint layer by other fastening patches.

Another object of the invention is to provide an inflatable module with a structural core and inflatable shell, in combination with an improved deployment system for releasing the shell from a pre-deployment configuration in which the shell is collapsed, deflated, and folded around the structural core, to a deployed configuration in which the shell is inflated and surrounds the structural core to define an enclosed space interior of the shell. The deployment system may utilize multiple cords or other flexible deployment members to connect two adjacent gores when the shell is folded around the structural core, and allows deployment to be achieved by cutting one cord in a chain of multiple cords which connect the two adjacent gores. In another embodiment, circumferentially spaced cords may form another chain which surrounds the collapsed and deflated shell, and cutting one of the circumferential cords releases each of the cords in the circumferential chain, which in turn releases each of multiple cords which connect adjacent gores.

Still another object of the invention is to provide improvements to an inflatable shell of a module comprising a plurality of circumferentially spaced gores, wherein each of a plurality of layers within the shell are spaced from other layers by flexible cables each having a plurality of stops along the length of the cable for positioning the spaced apart layers when the shell is inflated. Each of the plurality of layers may comprise layer segments which overlap a respective cord. Foam layers may be spaced between two spaced apart layers, with the foam in each layer positioned within a bag spaced in one of the plurality of gores. A vacuum in each bag may reduce the spacing between layers when the shell is collapsed and deflated.

When the module of the present invention is intended for space applications, the inflatable shell may be provided with an atomic oxygen resistant layer which is spaced from the insulation layer by a deployment layer. The bladder may then be spaced opposite the deployment layer with respect to the insulation layer. A plurality of deployment tabs each secured to the deployment layer may extend through the atomic oxygen resistant layer for maintaining the shell in the pre-deployment configuration and for selectively releasing the shell to the deployment configuration.

These and further objects, features, and advantages of the present invention will become apparent from the following detailed description, wherein reference is made to the figures in the accompanying drawings.

BRIEF DESCRIPTION OF THE DRAWINGS

FIG. 8 is a partial cut-away isometric view of the module with the inflatable shell inflated, including the horizontal fairing in its second configuration.

FIG. 9 is an isometric view of the structural core, including the horizontal fairing in its first configuration.

FIG. 11 is an isometric view of the first embodiment of the end rings.

FIG. 12 is a cross-sectional view of the first embodiment of the end rings.

DETAILED DESCRIPTION OF PREFERRED EMBODIMENTS

Figure 1:
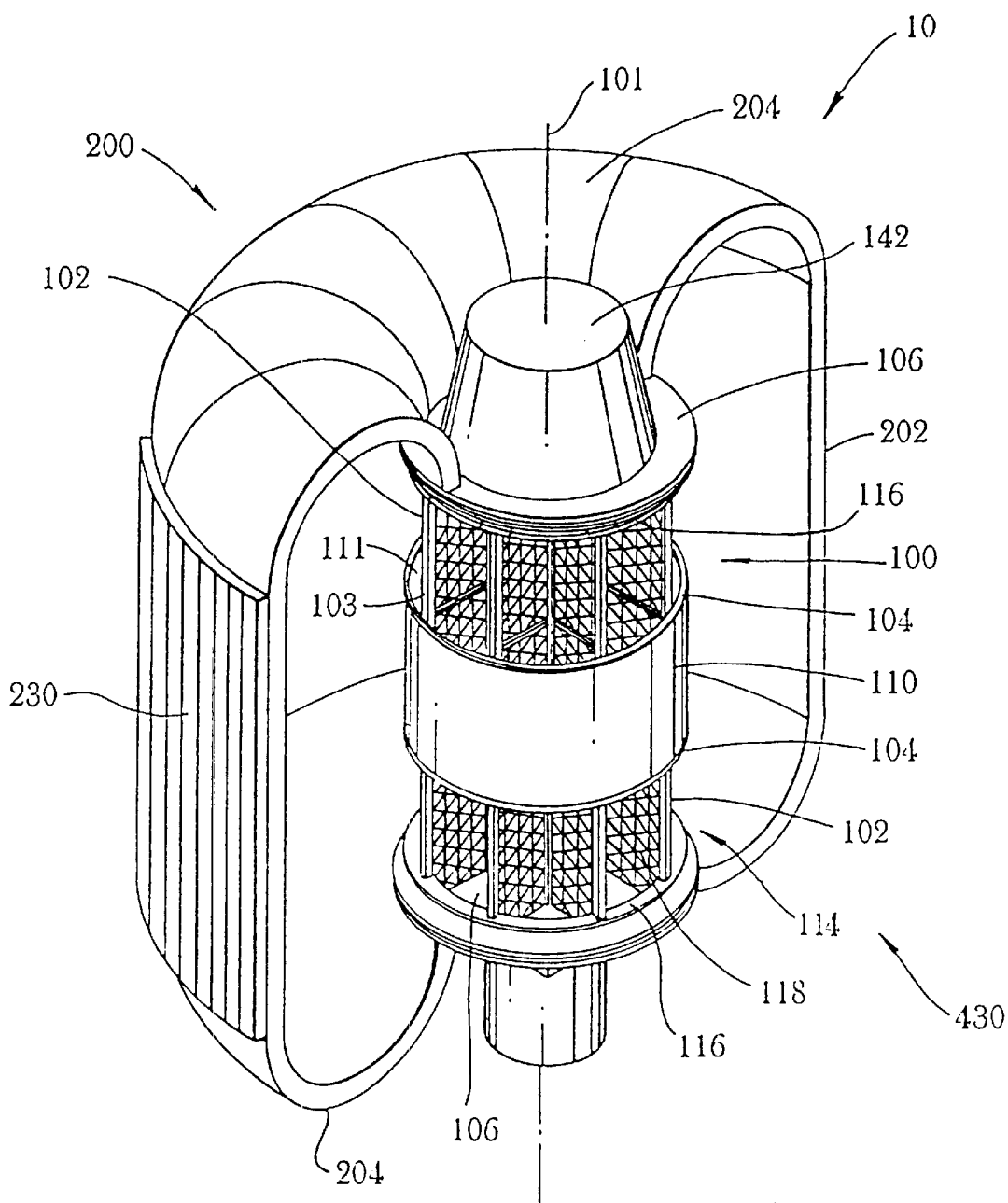
FIG. 1 is a partial cut-away isometric view of the module in the deployed configuration.

The invention is shown in FIGS. 1 through 20 and the advanced structural and inflatable vessel or module is depicted as 10. In general, the module 10 comprises a structural core 100, an inflatable shell 200, and a launch restraint 400 (shown in FIG. 20 only). A carrier 300 is also included in one embodiment of the invention.

The module 10 is intended to provide a large volume, but lightweight, vessel or module. As related elsewhere herein, the vessel or module is useful for many purposes, and is particularly suited for long duration space flight. Such possible uses for the module 10 include, but are not limited to, a habitation element of an interplanetary vehicle that transports humans between planetary destinations, a habitation or laboratory module on the International Space Station and the like, and a laboratory or habitation module pre-deployed to a planetary or lunar surface.

Figure 7:
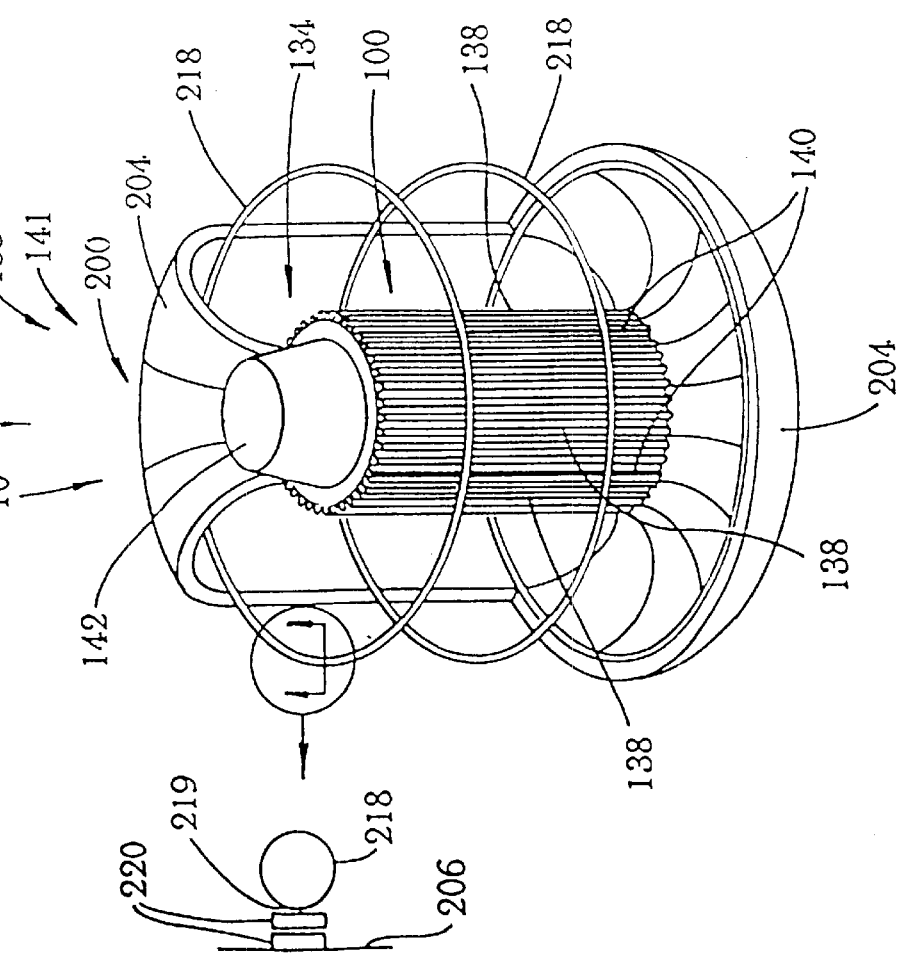
FIG. 7 is a partial cut-away isometric view of the module with the inflatable shell inflated, including the vertical fairing in its second configuration.

The module 10 has two basic configurations: a launch configuration 410 (shown in FIGS. 2, 3, and 20) and a deployed configuration 430 (shown in FIGS. 1, 7, and 8). In the launch configuration 410, the thickness or interior of the inflatable shell 200 is collapsed by vacuum, and the inflatable shell is deflated, collapsed, and efficiently folded around the structural core 100. The launch restraint 400 (FIG. 20) maintains the inflatable shell 200 in its collapsed and folded arrangement around the structural core 100. Both the deflated inflatable shell 200 and the structural core 100 are stored within the payload bay of an appropriate launch vehicle, such as the Space Shuttle. In the embodiment which includes carrier 300, module 10 is stored within carrier 300, and carrier 300 is stored within the payload bay.

The launch vehicle then transports the module 10 in its launch configuration 410 from the earth's surface. Upon release of deployment cords 536, the inflatable shell 200 automatically expands and regains its full thickness, and the inflatable shell 200 is inflated to its full volume and surrounds the structural core 100. In the deployed configuration 430, the volume of the module 10 is substantially larger than that of the entire Space Shuttle payload bay.

Structural Core 100

Figure 3:
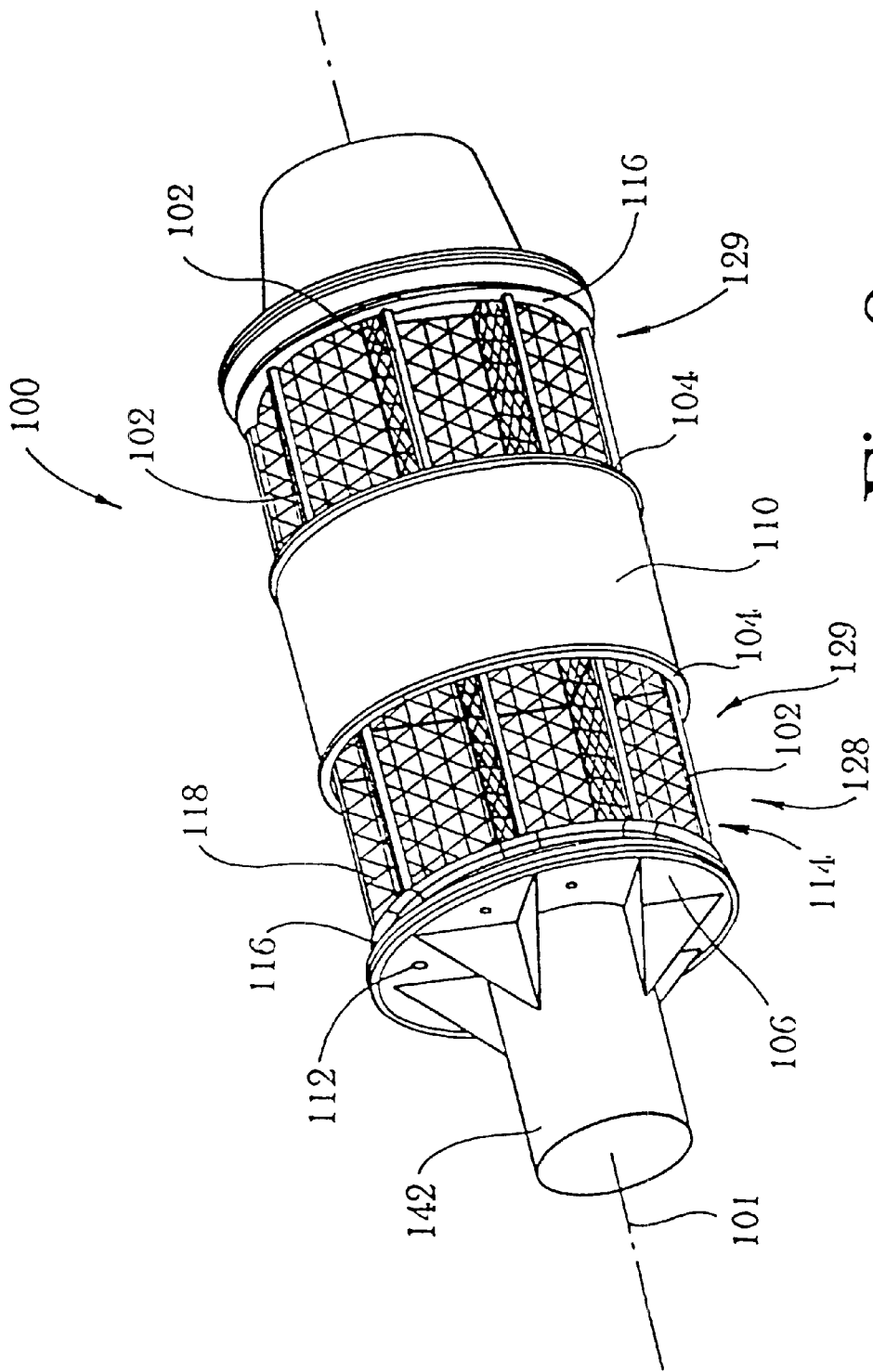
FIG. 3 is an isometric view of the structural core.
Figure 4:
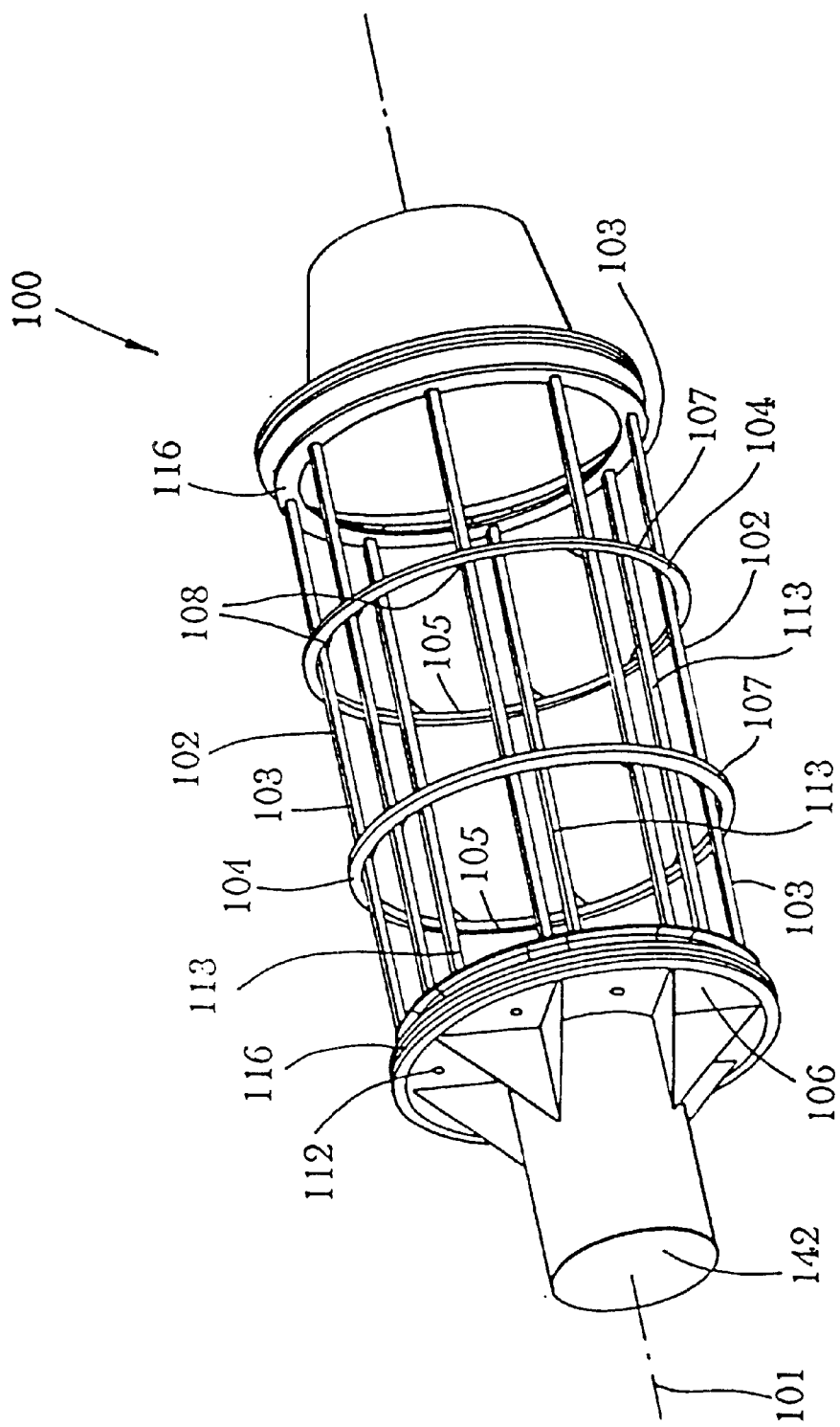
FIG. 4 is an isometric view of the structural core without the shelves included therein.

As best seen in FIGS. 3 and 4, structural core 100 is preferably generally cylindrical in shape and includes a longitudinal axis 101. In addition, structural core 100 is preferably composed of, or preferably includes, at least one longeron 102, at least one body ring 104, two endplates 106, and two end rings 116. The two endplates 106 correspond to the circular ends of the structural core's 100 cylindrical shape. Each longeron 102 extends in a direction parallel to the longitudinal axis 101 of the cylindrical shape and is fixedly attached to one of the two end plates 106. Each body ring 104 is fixedly attached to each longeron 102.

Corresponding to the ends of the structural core's 100 cylindrical shape, each end plate 106 is circular in shape.

Each endplate 106 also preferably includes a plurality of hermetically sealed pass through holes 112 extending therethrough. Pass through holes 112 accommodate utility and umbilical conduits enabling easy connection of necessary plumbing, power, data, and other resources from the interior to the exterior of module 10.

Each longeron 102 includes an inner surface 113 proximate the longitudinal axis 101 and an outer surface 103 distal the longitudinal axis 101. In the preferred embodiment, each longeron 102 includes a cross-sectional area having a generally rectangular shape. Also in the preferred embodiment, each longeron 102 extends along the periphery of the structural core's 100 cylindrical shape. In addition, structural core 100 preferably includes a plurality of longerons 102. The longerons 102 extend along the periphery of the cylindrical shape and are spaced apart about the longitudinal axis 101 of the cylindrical shape.

Each body ring 104 includes an inner surface 105 proximate the longitudinal axis 101 and an outer surface 107 distal the longitudinal axis 101. In the preferred embodiment, each body ring 104 includes a cross-sectional area having a generally rectangular shape. Preferably, each body ring 104 surrounds and is attached to each longeron 102 so that the inner surface 105 of each body ring 104 abuts the outer surface 103 of each longeron 102. In the preferred embodiment, each body ring 104 extends in a cross-sectional plane that is parallel to each of the endplates 106. Also in the preferred embodiment, structural core 100 includes one body ring 104 for each buckling mode node on longeron 102 so that each body ring 104 is attached at the corresponding buckling mode node location of each longeron 102.

In addition, each body ring 104 is preferably attached to each longeron 102 by way of a ring bracket 108 (FIG. 4). Ring brackets 108 are constructed of light weight materials, such as aluminum or titanium. In one embodiment (not shown), each body ring 104 is comprised of segments which together make up the ring shape.

Structural core 100 also preferably includes at least one water tank 110. In one preferred embodiment, structural core 100 includes one water tank 10 having a cylindrical shape with an annular cross-section. In this embodiment, water tank 110 extends between two body rings 104 and around each longeron 102 so that the inner surface 111 of water tank 110 abuts the outer surface 103 of each longeron 102. Water tank 110 is, in this embodiment, securely attached to two adjacent body rings 104 and may include multiple independent water reservoirs. In another preferred embodiment (not shown), structural core 100 includes a plurality of arcuate water tanks 110 that aggregately make up the cylindrical shape. In this embodiment, each water tank 110 extends between two body rings 104 and around the corresponding longerons 102 so that the inner surface 111 of each water tank 110 abuts the outer surface 103 of the corresponding longerons 102. It is noted that the enclosing configuration of water tank 110 provides radiation environmental protection to the enclosed area from solar and other radiation activity.

Figure 5:
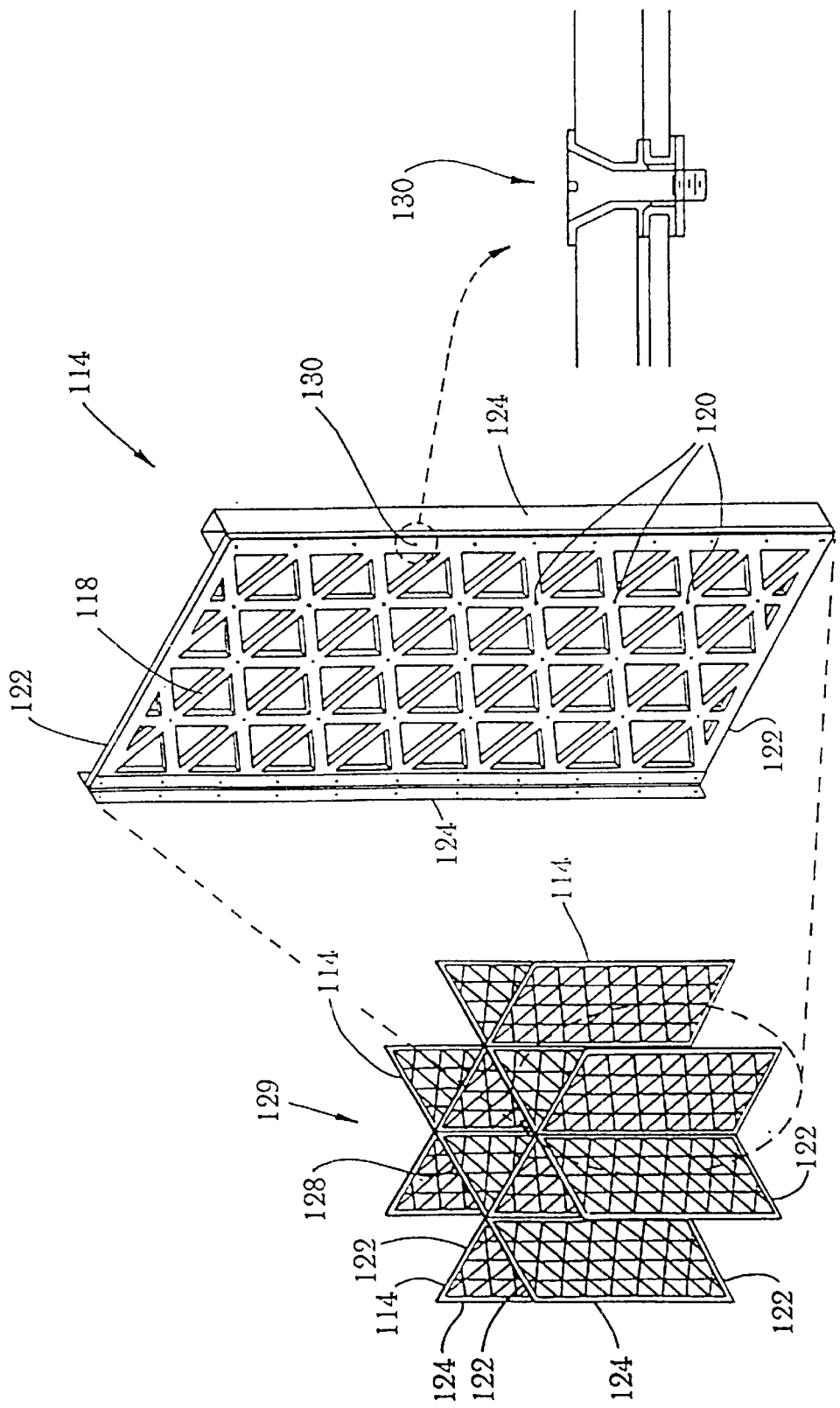
FIG. 5 is an isometric view of the shelves, partially in the cruciform configuration.

Structural core 100 also preferably includes a plurality of removable shelves 114. As illustrated in FIG. 5, each shelf 114 is constructed in the form of an isogrid pattern 118. Each shelf 114 is also preferably constructed from a composite material. In the preferred embodiment, each shelf 114 has a rectangular shape including two opposite first ends 122 and two opposite second ends 124. It is noted that, although each shelf 114 is preferably rectangular in shape, all shelves 114 are not necessarily the same size.

When module 10 is in the launch configuration 410, the shelves 114 are positioned within the cylindrical shape of module 10 interior to the longerons 102, preferably in a cruciform pattern 128 as shown in FIGS. 1, 3, and 5. In the preferred embodiment, the cruciform pattern 128 extends from end plate 106 to end plate 106 and comprises a plurality of cruciform pattern components 129. The cruciform pattern components 129 are stacked one on top of the other, establishing the overall shape of the cruciform pattern. Preferably, cruciform pattern 128 includes a different cruciform pattern component 129 for each distance between an end ring 116 and a body ring 104 and for each distance between two body rings 104.

The shelf-to-shelf attachment of the cruciform pattern 128 and of the cruciform pattern components 129 is enabled by a plurality of shelf-to-shelf attachment means 130 included on the ends, 122 and 124, of each shelf 114. Each shelf-to-shelf attachment means 130 is mateable with all other shelf-to-shelf attachment means 130. Thus, in the cruciform patterns 128 of the launch configuration 410, each of the two opposite first ends 122 and each of the two opposite second ends 124 of each shelf 114 are either attached to one of the two opposite second ends 124 of another shelf 114 (by way of shelf-to-shelf attachment means 130), to one of the two opposite first ends 122 of another shelf 114 (by way of shelf-to-shelf attachment means 130), or to the inner surface 113 of a longeron 102. Therefore, to accommodate the cruciform pattern 128 of the shelves 114 and to maintain the integrity of the structural core 100, each longeron 102 includes a plurality of longeron-to-shelf attachment means (not shown) at its inner surface 113. Each longeron-to-shelf attachment means is mateable with each shelf-to-shelf attachment means 130 of shelves 114.

In the preferred embodiment, the cruciform pattern 128 of shelves 114 extends between the two endplates 106 when module 10 is in the launch configuration 410. In this embodiment, the shelves 114 which are proximate to each end plate 106 are selectively removably attached to such end plate 106. Thus, each end plate 106 must include a plurality of end plate-to-shelf attachment means (not shown) that are mateable with the shelf-to-shelf attachment means 130 of shelves 114.

It is understood that each shelf-to-shelf attachment means 130, longeron-to-shelf attachment means, and end plate-to-shelf attachment means comprises mechanisms that are well known in the art. Such mechanisms may include bolts, screws, and/or snap-tight locking mechanisms. It is also understood that each shelf 114 may include different sets of attachment means, one to attach to other shelves 114 in the cruciform pattern 128 and others to attach to the other elements of the module 10.

Each shelf 114, and its isogrid pattern 118, also includes a plurality of attachment points 120. Preferably, the attachment points 120 are regularly spaced on the nodes of the shelfs 114 isogrid pattern 118. Preferably, the attachment points 120 are mateable with the shelf-to-shelf attachment means 130 of other shelves 114 so that the shelves 114 may be attached to each other in an arrangement other than end, 122 or 124, to end, 122 or 124.

As best seen in FIGS. 2 and 6–9, structural core 100 also includes a fairing 134. In the launch configuration 410, fairing 134 is disposed around the periphery of the cylindrical shape of structural core 100. Fairing 134 includes two embodiments, a horizontal fairing 250 embodiment and a vertical fairing 135 embodiment. For each embodiment, fairing 134 includes two configurations: a first configuration 137 corresponding to the module's 10 launch configuration 410 and a second configuration 139 corresponding to the module's 10 deployed configuration 430.

As shown in FIGS. 8 and 9, horizontal fairing 250 comprises a plurality of struts 256 and a plurality of floor segments 264 (shown in FIG. 8 but not in FIG. 9). Horizontal fairing first configuration 252 is depicted in FIG. 9, while horizontal fairing second configuration 254 is depicted in FIG. 8.

Each strut 256 is elongate in shape and includes a strut first end 258, a strut second end 260, and a strut body 262. Preferably, the cross-sectional area of each strut 256 is generally rectangular. The strut first end 258 of each strut 256 is pivotally attached to the exterior of the structural core 100, preferably to body rings 104. Also preferably, the plurality of struts 256 are equally spaced about each body ring 104. In the preferred embodiment, the struts 256 are attached to the body rings 104 so that each strut 256 is located intermediate two longerons 102.

In the first (launch)configuration 252, each strut 256 is pivoted about strut first end 258 so that its strut body 262 is adjacent to the structural core 100. Preferably, in the first configuration 252, each strut body 262 is parallel to longerons 102. In the second (deployed) configuration 254, each strut 256 is pivoted about its strut first end 258 so that strut body 262 is normal to and strut second end 260 is distal to its corresponding body ring 104. Essentially, in the second configuration 254, each strut 256 extends radially, perpendicular to the longitudinal axis 101. It is noted that the length of each strut 256 is such that, when struts 256 are in the second configuration 254 with module 10 in its deployed configuration 430, the strut second end 260 of each strut 256 is proximate to inflatable shell 200.

A floor segment 264 is attached to immediately adjacent struts 256 on each body ring 104. Preferably, each floor segment 264 is constructed from a flexible yet sturdy material, such as corrugated graphite-epoxy sheet. It is noted that the material comprising floor segment 264 is flexible in one direction, but is stiff in the other directions. In the first (launch) configuration 252, the flexibility of the floor segment 264 in one direction allows each floor segment 264 to be partially folded onto itself and thereby lie along the periphery of the cylindrical shape between its two corresponding struts 256. In the second (deployed) configuration 254, the stiffness of the floor segments 264 in the other directions allows each floor segment 264 to support weight and serve as flooring in the module 10. Also preferably, the shape of each floor segment 264 is such that each floor segment 264 is taut between its two adjacent struts 256 and is parallel to the strut bodies 262 when struts 256 are in the second configuration 254 (as shown in FIG. 8).

Each strut 256 also includes a plurality of strut-to-shelf attachment means (not shown). The strut-to-shelf attachment means of struts 256 are mateable to the shelf-to-shelf attachment means 130 of each shelf 114. Thus, the attachment of a shelf 114 to two struts 256 in the same longitudinal plane (with reference to longitudinal axis 101) stabilizes and solidifies the position of such struts 256 in their second configuration 254. Such attachment is shown in FIG. 8.

Figure 6:
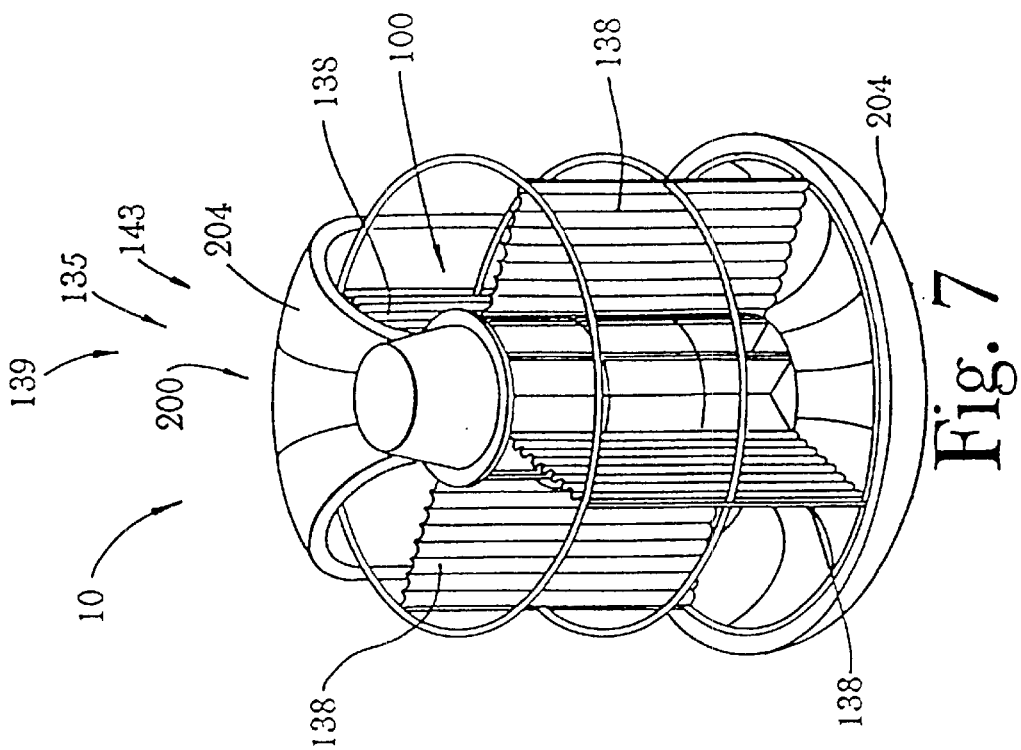
FIG. 6 is a partial cut-away isometric view of the module with the inflatable shell inflated, including the vertical fairing in its first configuration.

Vertical fairing 135, in the preferred embodiment, is generally cylindrical in shape and, when positioned in its first configuration 141, completely encloses the heretofore described elements of the structural core 100. Vertical fairing first configuration 141 is depicted in FIG. 6, while vertical fairing second configuration 143 is depicted in FIG. 7.

In the preferred embodiment, vertical fairing 135 comprises a plurality of attached curved fairing segments 138. The plurality of curved fairing segments 138 are attached by any of a variety of well-known means. Also preferably, vertical fairing 135 is constructed from a corrugated material which is able to be bent into the cylindrical shape of vertical fairing 135, but is naturally flat. Thus, when the plurality of curved fairing segments 138 are detached from each other, each fairing segment 138 returns to its natural, unstressed flat disposition.

In the vertical fairing second configuration 143 (FIG. 7), the curved fairing segments 138 have been detached from each other. With module 10 in its deployed configuration 430 and inflatable shell 200 in its fully inflated state, each fairing segment 138 is positioned so that it extends from the outer surface 103 of a longeron 102 to the inflatable shell 200, extending radially perpendicular to the longitudinal axis 101. Thus, for vertical fairing 135, structural core 100 must also include a longeron-to-fairing segment attachment means (not shown) which removably attaches each fairing segment 138 to the corresponding longeron outer surface 103. Preferably, vertical fairing 135, and each fairing segment 138, includes fairing-to-shelf attachment means (not shown) for the shelves 114. Both longeron-to-fairing attachment means and fairing-to-shelf attachment means are well known in the art and may include bolts, screws, and/or snap-tight locking mechanisms.

Figure 10:
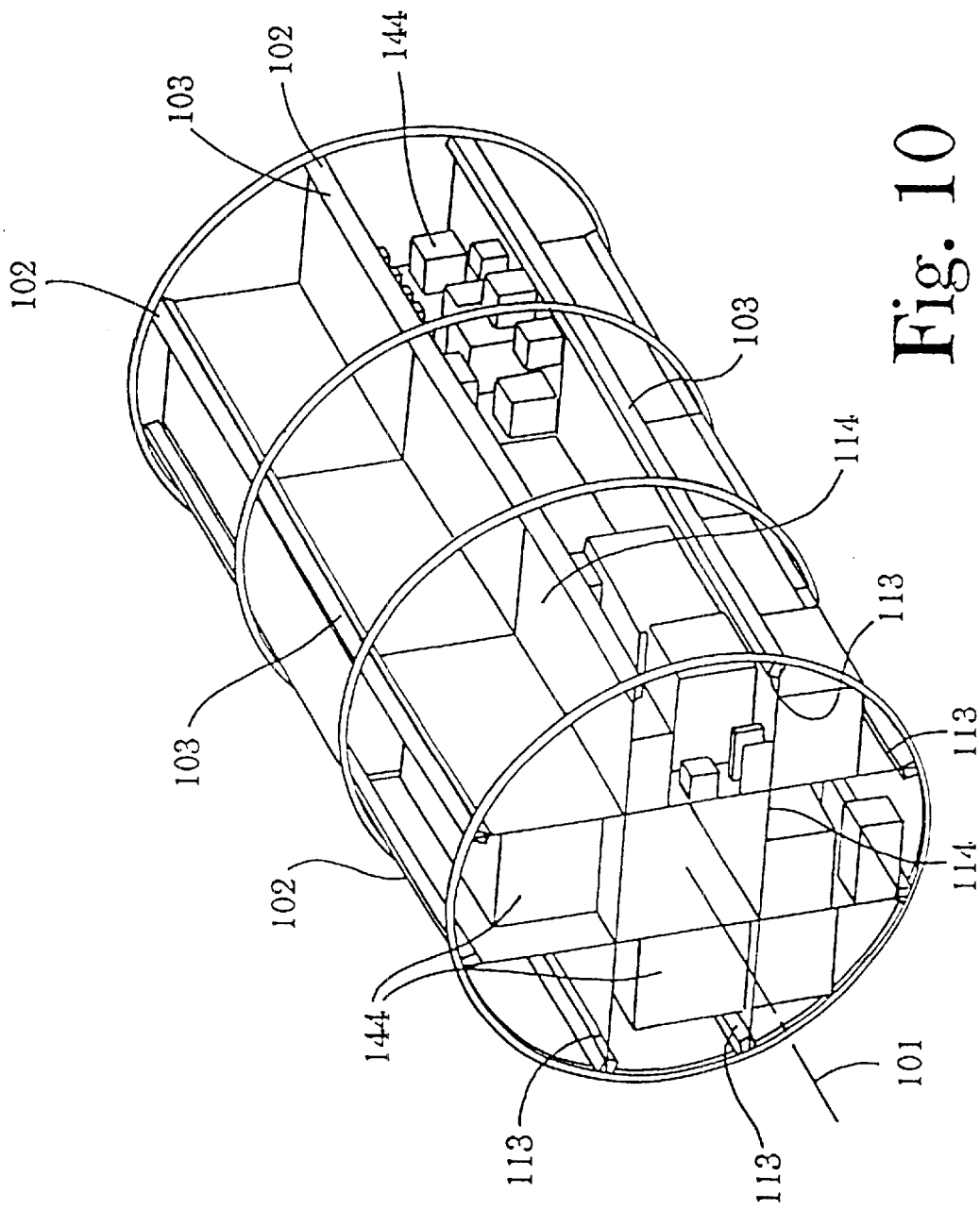
FIG. 10 is an isometric view of the structural core, including the plurality of support system structures.

The structural core 100 also includes an airlock 142 (FIG. 6) and a plurality of support system structures 144 (FIG. 10). Airlock 142 is attached to one of the two endplates 106 and can be accessed through such endplate 106 from within the structural core 100. The relevant end plate 106 thus includes an airlock opening (not shown). Preferably, support system structures 144, as best seen in FIG. 10, are pre-attached to specific shelves 114 so that each structure 144 need not be detached from its corresponding shelf 114 once module 10 is in the deployed configuration 430. Thus, if need be, each shelf 114, including any structure 144 attached thereto, is moved from its position in the cruciform pattern 128 of the launch configuration 410 to its end position in the deployed configuration 430. One of the module structures 144 structurally supports a life support system which is integrated into the structural core 100 and is regenerative, featuring one hundred percent reuse of air and water. In the preferred embodiment, the water tank(s) 110 constitute a part of such regenerative life support system.

Figure 14:
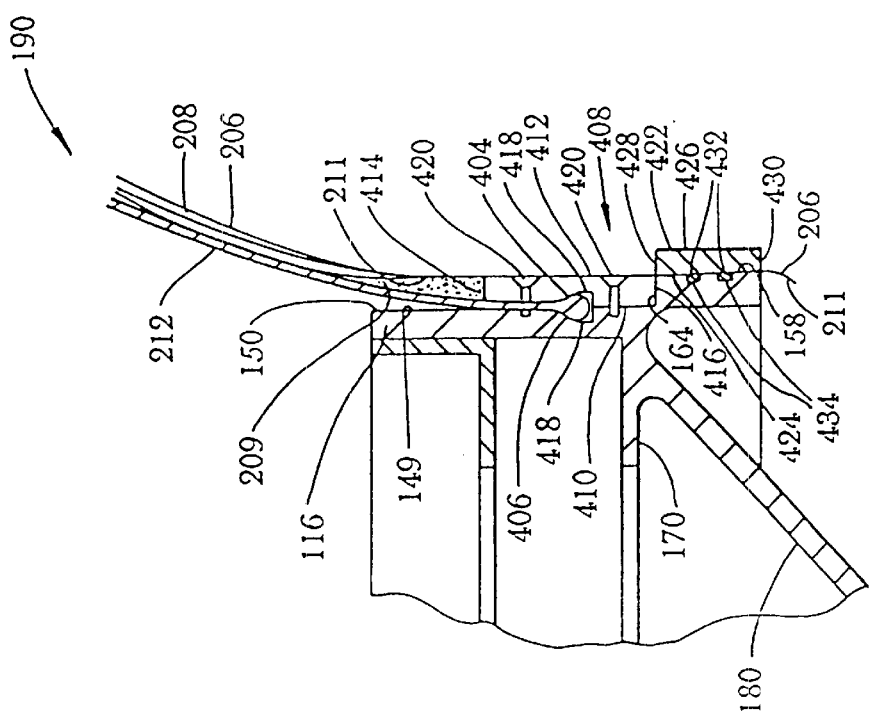
FIG. 14 is a cross-sectional view of the sealing attachment between the inflatable shell and the first embodiment of the end rings.
Figure 13:
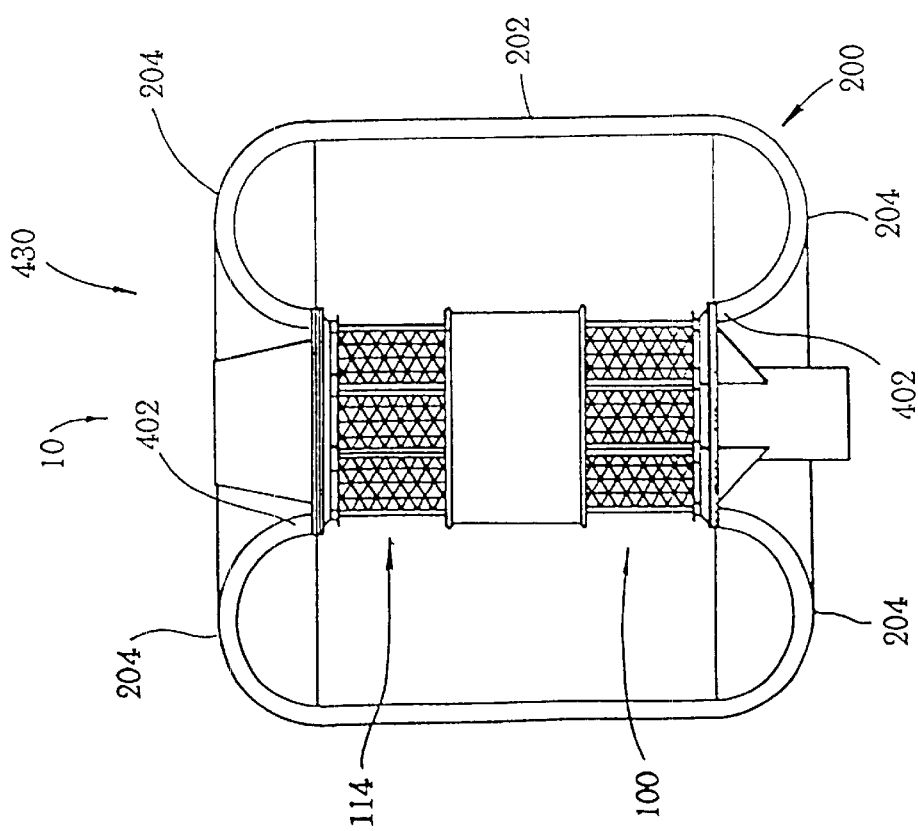
FIG. 13 is a partial cut-away elevational view of the module, including the inflated inflatable shell.
Figure 15:
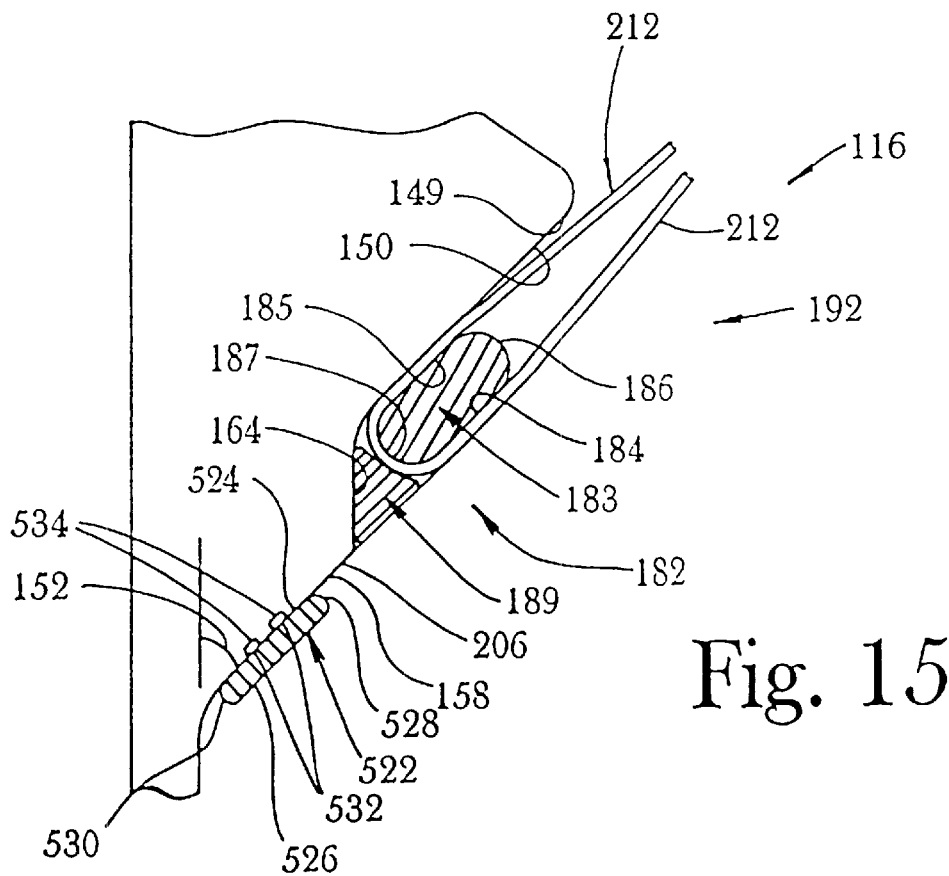
FIG. 15 is a cross-sectional view of the sealing attachment between the inflatable shell and the second embodiment of the end rings.

The two end rings 116 have two alternative preferred embodiments, a first embodiment 190 (shown in FIGS. 11, 12, and 14) and a second embodiment 192 (shown in FIG. 15). In both embodiments, 190 and 192, each end ring 116 includes an outer surface 150 distal to the longitudinal axis 101. End ring outer surface 150 includes a primary end ring area 149, a secondary end ring area 158, and a shoulder end ring area 164. Generally, primary end ring area 149 is proximate while secondary end ring area 158 is distal the end ring's 116 corresponding endplate 106. Shoulder end ring area 164 is intermediate primary end ring area 149 and secondary end ring area 158.

In the first alternative preferred embodiment 190 (FIGS. 12, 13), primary end ring area 149 and secondary end ring area 158 are both concentric with the longitudinal axis 101 of the structural core's 100 cylindrical shape. Shoulder end ring area 164, in the first embodiment 190, is perpendicular to the longitudinal axis 101, the primary end ring area 149, and the secondary end ring area 158. In the preferred embodiment, the diameter of end ring 116 at primary end ring area 149 is smaller than the diameter of end ring 116 at secondary end ring area 158.

In the second alternative preferred embodiment 192 (FIG. 15), primary end ring area 149 and secondary end ring area 158 extend at conic half angle 152 in relation to the longitudinal axis 101 so that the diameter of end ring 116 increases from secondary end ring area 158 to primary end ring area 149. Shoulder end ring area 164, in this second embodiment 192, is generally concentric with the longitudinal axis 101.

In both the first and second alternative preferred embodiments, 190 and 192, each end ring 116 also preferably includes a primary shoulder 170 and a secondary shoulder 180. Both primary shoulder 170 and secondary shoulder 180 extend radially inward in relation to the longitudinal axis 101 of the structural core's 100 cylindrical shape.

In addition, in both embodiments, 190 and 192, each of the two end rings 116 is concentrically and fixedly attached to one of the two end plates 106 at or adjacent to the primary end ring area 149. In another embodiment, each end ring 116 and its corresponding end plate 106 comprise one integral element.

Each of the two end rings 116 also includes a lower surface 151. Each of the two end rings 116 is fixedly attached, by means well known in the art such as welding or bolting, at its end ring lower surface 151 to an end of each longeron 102. Thus, each longeron 102 extends from the end ring lower surface 151 of one of the two end rings 116 to the end ring lower surface 151 of the other end ring 116.

Inflatable Shell 200

Figure 20:
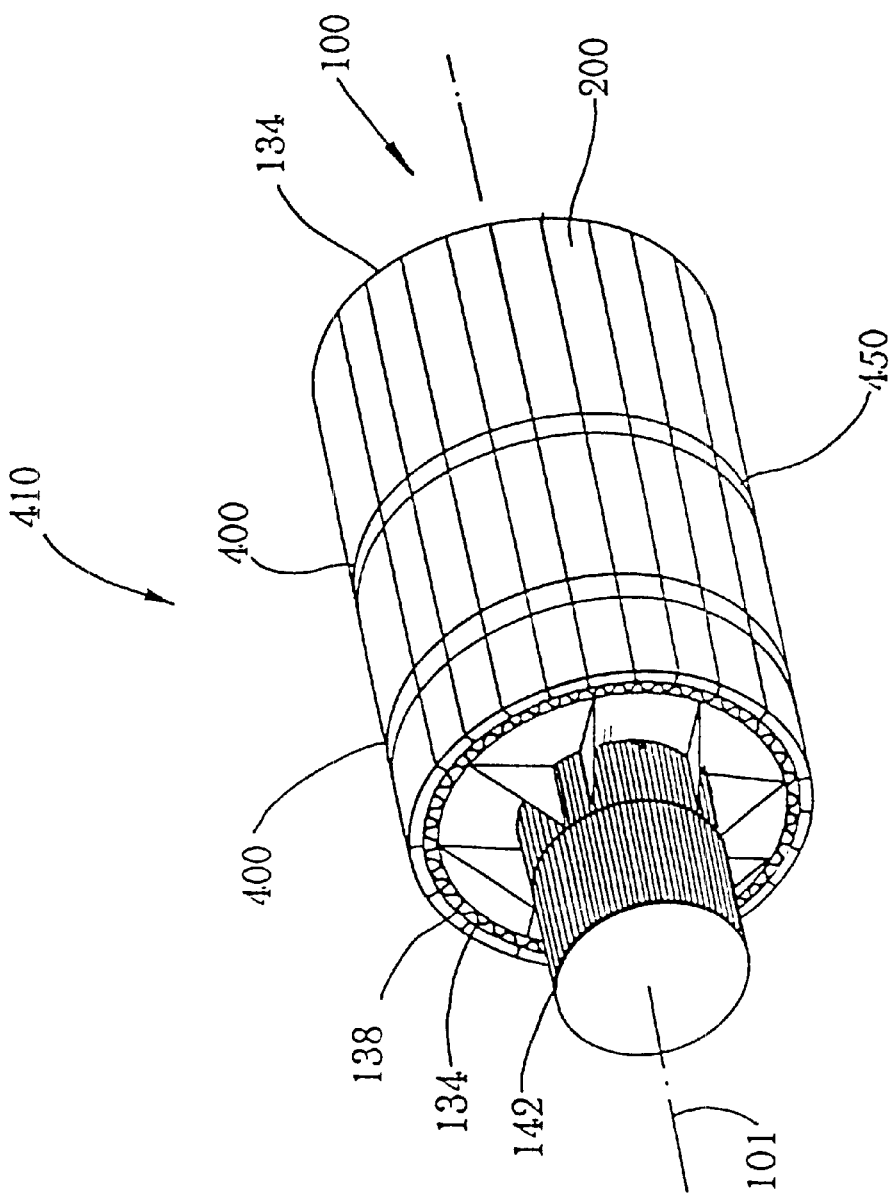
FIG. 20 is an isometric view of the inflatable shell folded around the structural core.

Inflatable shell 200 is a multi-layer construction of soft goods that can be folded around the structural core 100 for efficient packaging in the launch configuration 410 and then inflated into the deployed configuration 430. In the launch configuration 410, as best seen in FIG. 20, the thickness or interior of inflatable shell 200 is collapsed by vacuum, and the inflatable shell 200 as a whole is deflated, collapsed, and efficiently folded around the structural core 100. In particular, inflatable shell 200 is deflated and is collapsed and efficiently folded around the fairing 134. The launch restraint 400 maintains the inflatable shell 200 in its collapsed and folded arrangement around the structural core 100 or fairing 134. Once fully inflated into the deployed configuration 430, as seen in FIG. 1, the shape of the inflatable shell 200 is preferably a circular cylinder 202 with semi-toroidal ends 204. The semi-toroidal ends 204 are maintained in their proper shape by the cloth pattern geometry and by the tension provided by the longerons 102.

Figure 17:
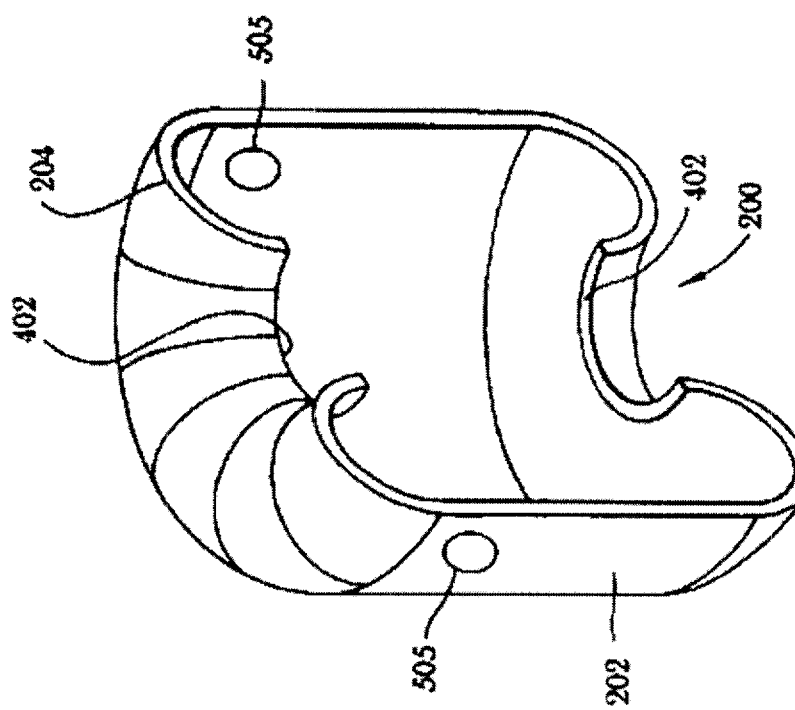
FIG. 17 is an isometric view of half of the inflatable shell.
Figure 18:
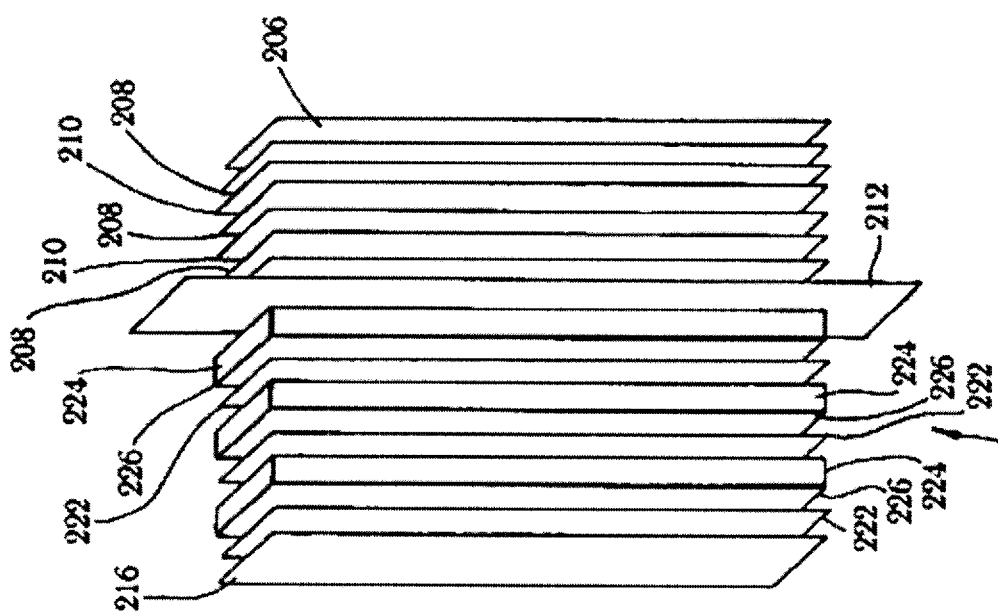
FIG. 18 is an exploded view of the layers comprising the inflatable shell.

As shown in FIGS. 17 and 18, in general and from inside to outside, inflatable shell 200 comprises the following layers: an inner liner 206, a plurality of alternating layers of bladders 208 and bleeder cloths 210, a structural restraint 212, a meteoroid orbital debris (M/OD) shield assembly 214, and an outer liner 216. Further, the inflatable shell 200 includes a plurality of shape rings 218 interior to inner liner 206 secured in place once the inflatable shell 200 is fully inflated into the deployed configuration 430.

Inner liner 206 corresponds to the "inside" wall of inflatable shell 200 and provides damage protection to the plurality of bladders 208 should accidents occur within the module 10. Preferably, inner liner 206 is nonflammable, thereby restricting any fire to the interior of module 10.

Inner liner 206 also facilitates the attachment of the plurality of shape rings 218, as best seen in FIG. 6. Preferably, each shape ring 218 is inflatable and has a circular toroidal shape. The toroidal outer diameter 219 of each shape ring 218 is sized slightly larger than the cross-sectional diameter of inner liner 206 when inflatable shell 200 is in its deployed configuration 430. As a result, once inflated, each shape ring 218 abuts inner liner 206 maintaining a contact force radially outward on the multiple layers of the inflatable shell 200. For each shape ring 218, a hook and pile attachment system 220 is provided on inner liner 206 and shape ring 218 to restrict the movement and maintain the contact of the shape ring 218 in relation to inner liner 206.

Turning back to FIG. 18, the plurality of bladders 208 provide the redundant primary gas containment mechanism for the inflatable shell 200. The bladders 208 are sealed together to create a thicker single bladder 211 just before approaching the inner circumference 402 of the semi-toroidal ends 204. A flexible boot 209, shown in FIG. 14, provides a smooth transition between the redundant bladders 208 and the structural restraint 212 just prior to the location where the redundant bladders 208 are sealed together. In the preferred embodiment, the bladders 208 are each designed to be geometrically slightly larger in size than the structural restraint 212.

A bleeder cloth 210 is disposed between each consecutive pair of bladders 208. In the preferred embodiment, each bleeder cloth 210 is constructed from a light weight, porous, felt-like material. Among other functions, the bleeder cloths 210 prevent contact between bladders 208 thereby eliminating the threat of abrasion and film blocking and providing a cavity between each bladder 208. Thus, by providing a cavity between adjoining bladders 208, bleeder cloths 210 allow the pressure and integrity of each individual bladder 208 to be monitored and aid in the identification and location of bladder 208 leaks. Furthermore, because bleeder cloths 210 are porous, they enable the equalization of pressure within each cavity. In addition, one or more bleeder cloth 210 cavities can be mechanically evacuated (and still monitored) so that the lost gas from a bladder 208 interior leak can be recaptured and pumped back into the interior of the module 10 resulting in very low gas leak rates. During this evacuation process, the porous bleeder cloth 210 acts to prevent areas of gas entrapment (pinch off) between the bladders 208 and maintains a free gas flow path within each cavity. Other bleeder cloth 210 cavities can be filled with fluids that provide added radiation protection and/or aid in leak detection, location, and self sealing. In this scenario, bleeder cloth 210 acts to wick the contained fluid to ensure even fluid distribution within the corresponding cavity.

Structural restraint 212 is constructed from a high performance "soft goods" material that exhibits high strength and stiffness characteristics, such as Kevlar® or Vectran®. Structural restraint 212 is the primary structure of inflatable shell 200. Structural restraint 212 also serves to separate the inner layers (inner liner 206, bladders 208, and bleeder cloths 210) from the outer layers (M/OD shield assembly 214 and outer liner 216) of the inflatable shell 200.

As shown in FIG. 18, M/OD shield assembly 214 is composed of a plurality of bumper layers 222, a plurality of spacing layers 224, and adhesive 226. Bumper layers 222 act to shock, fragment, and vaporize incoming M/OD particles. Because extreme heat energy is generated in the resulting particle vapor cloud, each bumper layer 222 preferably includes a thin coating of an ablative energy absorbing adhesive 226, such as RTV silicone. Adhesive 226 also acts as an ablator for added M/OD shield assembly 214 performance. Consecutive bumper layers 222 are separated by a spacing layer 224. In the preferred embodiment, each spacing layer 224 is composed of light weight, open cell foam which can be cored out by intermittently cutting out material to achieve a still lighter weight. Each spacing layer 224 additionally includes gaps 228, as best seen in FIG. 19, specifically located to create hinge lines on inflatable shell 200 thereby enabling the folding of inflatable shell 200 for the launch configuration 410.

Each spacing layer 224 is thick enough to provide sufficient stand-off spacing between the other M/OD shield assembly 214 components. In addition, each spacing layer 224 (which comprises open cell foam in the preferred embodiment) enables the thickness or interior of inflatable shell 200 to be collapsed or shrunk by vacuum evacuation in order to aid in efficient folding and packaging. Thereafter, when it is exposed to the hard vacuum of space, the spacing layer 224 (which comprises open cell foam in the preferred embodiment) will naturally return to its original thickness providing the correct stand-off distance required for the M/OD shield assembly 214 components. Finally, the spacing layer 224 enables the M/OD shield assembly 214 to provide increased passive thermal control to the module 10. By having the wall thickness exposed to the vacuum of space, the spacing layer 224 becomes a good thermal insulator. In addition, since there is no fluid surrounding it, the spacing layer 224 cannot transmit heat through convection. Therefore, the only heat transfer method through inflatable shell 200 is radiation. Lastly, because the relatively thick spacing layer 224 provides a large cumulative thickness to the M/OD shield assembly 214, the spacing layer 224 also acts to provide shape retention to module 10 in the event of module 10 depressurization.

Figure 19:
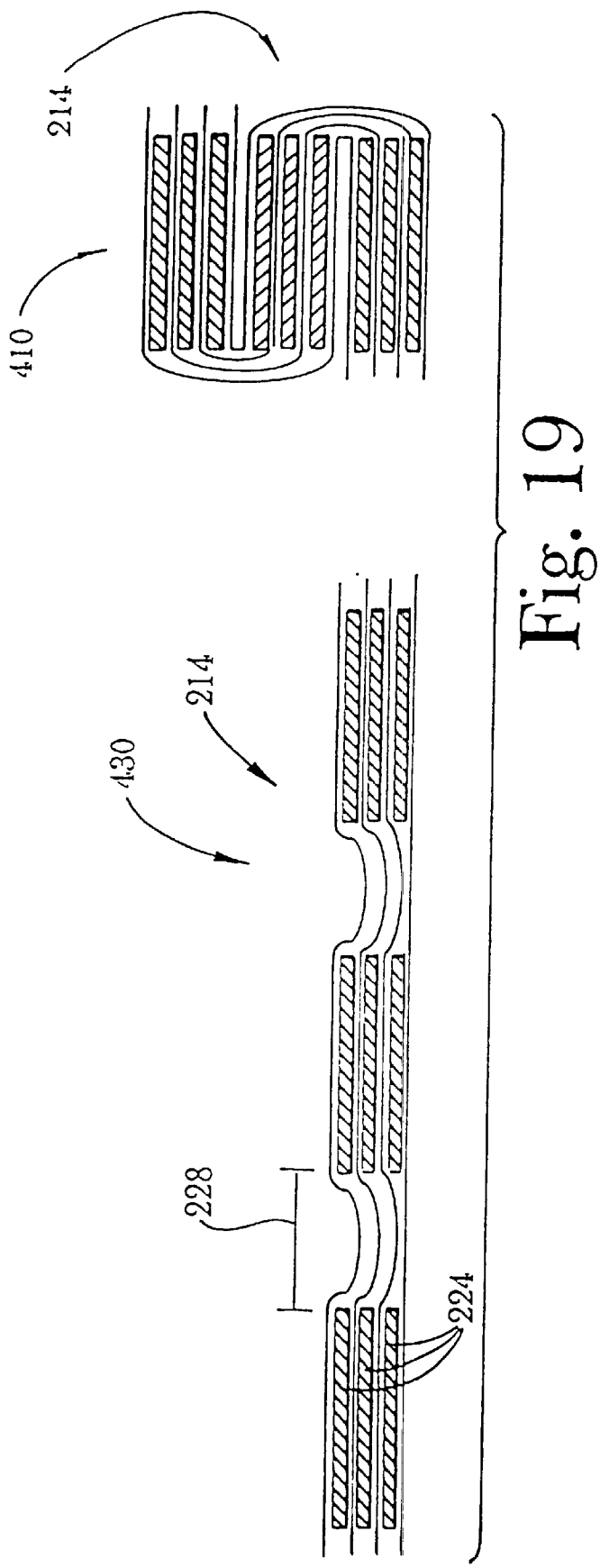
FIG. 19 is a cross-sectional view of the arrangement of the inflatable shell in the launch and deployed configurations.

The preferred folding pattern of inflatable shell 200 for the launch configuration 410 is illustrated in FIG. 19, including gaps 228 and open cell foam 224. The same pattern in the non-folded deployed configuration 430 is also shown in FIG. 19.

Outer liner 216 comprises a lightweight multi-layer insulating blanket that contains suitable radiation properties for primary passive thermal control. In addition, outer liner 216 provides an impermeable membrane to enable the vacuum compaction of the plurality of spacing layers 224 prior to folding and packaging.

In the preferred embodiment, a radiator 230, partially shown in FIG. 1, is selectively attached to the exterior of the inflatable shell 200. Thus, the inflatable shell 200, particularly the outer liner 216 of the inflatable shell 200, is constructed to enable such selective attachment. Preferably, the radiator 230 is flexible and is designed to be folded along with the inflatable shell 200. In another embodiment, the radiator 230 is attached separately after the inflation of the inflatable shell 200.

Connection of Structural Core 100 to Inflatable Shell 200

The inflatable shell 200 is sealingly attached to the structural core 100 at each end ring 116. As previously disclosed, the shape of inflatable shell 200 is semi-toroidal at each end. Each semi-toroidal end 204 includes an inner circumference 402. The inner circumference 402 of each semi-toroidal end 204 is sealingly attached to the corresponding end ring 116 of structural core 100. The arrangement of the sealing attachment between inner circumference 402 and end ring 116 depends on whether the first or second embodiment, 190 or 192, of end ring 116 is utilized.

As shown in FIG. 14, in the first embodiment 190 of end ring 116, at the inner circumference 402 of each semi-toroidal end 204, the structural restraint 212 of multi-layered inflatable shell 200 ends in a deadman 404. Deadman 404 has a thickness that is substantially larger than the thickness of the remainder of structural layer 212. Preferably, deadman 404 has a bulbous shape 406.

Deadman 404 is attached to the corresponding end ring 116 by way of a deadman retainer 408. Deadman retainer 408 is ring shaped and includes an outer surface 412, an inner surface 410, a top surface 414, and a bottom surface 416. Preferably, deadman retainer 408 has a generally rectangular cross-sectional area. Deadman retainer outer surface 412 is distal the longitudinal axis 101 of the structural core's 100 cylindrical shape while deadman retainer inner surface 410 is interior of the outer surface 412.

The diameter of deadman retainer 408 at the deadman retainer inner surface 410 is substantially equal to the diameter of primary end ring area 149. Thus, deadman retainer inner surface 410 and primary end ring area 149 abut each other along their respective circumferences. Also preferably, deadman retainer bottom surface 416 abuts shoulder end ring area 164. In addition, the diameter of deadman retainer 408 at the deadman retainer outer surface 412 is preferably substantially equal to the diameter of secondary end ring area 158.

Deadman 404 is retained between deadman retainer inner surface 410 and primary end ring area 149. To enable such retainment, deadman retainer inner surface 410 and primary end ring area 149 include opposing grooves 418 which, when placed in opposing abutment, are sized and constructed to securely hold deadman 404 therein.

Preferably, from deadman retainer groove 418, deadman retainer inner surface 410 is gradually tapered away from end ring 116 towards deadman retainer top surface 414. This taper facilitates the placement of structural restraint 212 therebetween.

Deadman retainer 408 is securely attached to primary ring component 149 by way of a plurality of deadman retainer bolts 420. Such type of attachment is widely known in the art. Preferably, sets of two deadman retainer bolts 420 are equally spaced about the circumference of deadman retainer 408. For each set of two deadman retainer bolts 420, the two deadman retainer bolts 420 are attached on the same longitudinal cross-sectional plane, one on either side of the opposing grooves 410.

In this end ring first embodiment 190, the inner liner 206 and the plurality of bladders 208 of inflatable shell 200 are also sealingly attached to each end ring 116 at the inner circumference 402 of each semi-toroidal end 204. Specifically, the inner liner 206 is constrained between the secondary end ring area 158 of each end ring 116 and a seal ring 422. Inner liner 206 is thus preferably longer than structural restraint 212. Each seal ring 422 is attached to its corresponding end ring 116 at the secondary end ring area 158 by means of attachment well-known in the art, such as bolting similar to that of deadman retainer 408. As previously disclosed, the plurality of bladders 208 are sealed together to create a thicker single bladder 211 just before approaching the inner circumference 402. The thicker single bladder 211 is also sealingly constrained between the secondary end ring area 158 of each end ring 116 and seal ring 422, and is thus also preferably longer than structural restraint 212.

Seal ring 422 includes an inner surface 424, an outer surface 426, a top surface 428, and a bottom surface 430. Preferably, seal ring 422 has a generally rectangular cross-sectional area. Seal ring outer surface 426 is distal while seal ring inner surface 424 is proximate the longitudinal axis 101 of the structural core's 100 cylindrical shape.

The diameter of seal ring 422 at the seal ring inner surface 424 is substantially equal to the diameter of secondary end ring area 158. Thus, seal ring inner surface 424 and secondary end ring area 158 abut each other throughout their respective circumferences and securely retain a portion of inner liner 206 and a portion of the thicker single bladder 211 therebetween.

Two annular seals 432 are disposed between seal ring inner surface 424 and secondary end ring area 158 in order to provide a sealing engagement to such abutment. To accommodate annular seals 432 therebetween, secondary end ring area 158 is provided with two annular seal grooves 434, each sized and constructed to hold an annular seal 432 therein.

As previously disclosed (FIG. 14), inflatable shell 200 comprises a flexible boot 209 which provides a smooth transition between bladders 208 and structural restraint 212. Flexible boot 209 is disposed and constricted between the inside of structural restraint 212, deadman retainer top surface 414, and the outside of the outermost bladder 208.

Figure 16:
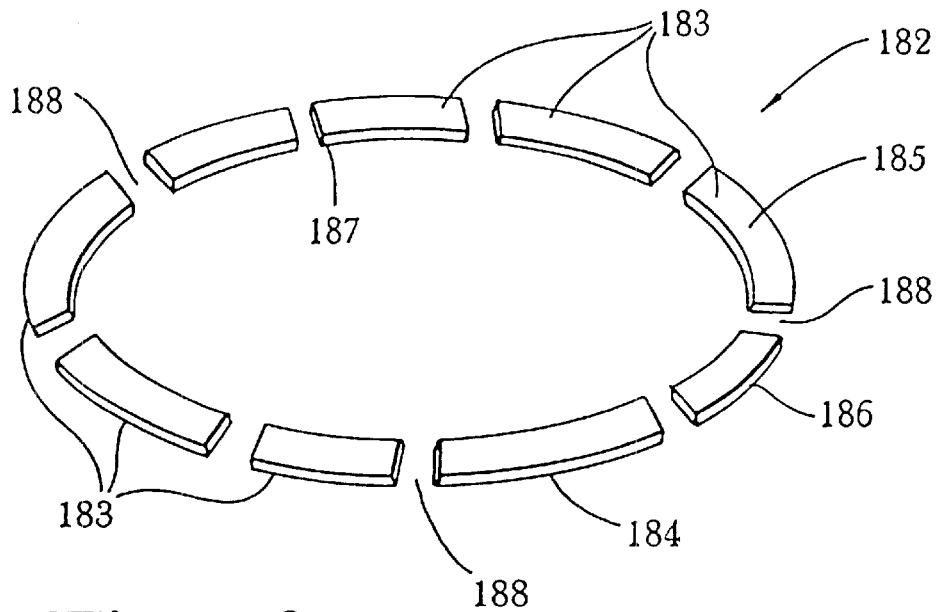
FIG. 16 is an isometric view of one embodiment of the attachment ring.

As shown in FIG. 15, in the second embodiment 192 of end ring 116, the structural restraint 212 includes an attachment ring 182 at the inner circumference 402 of each semi-toroidal end 204. In one embodiment, attachment ring 182 comprises one solid piece. In another embodiment, as shown in FIG. 16, attachment ring 182 is comprised of a plurality of ring segments 183 with gaps therebetween. Attachment ring 182 (and each ring segment 183 in the relevant embodiment) has a thickness that is substantially larger than the thickness of the remainder of structural layer 212. Also preferably, attachment ring 182 (and each ring segment 183 in the relevant embodiment) is fixedly connected to the structural restraint 212 at the inner circumference 402 of each semi-toroidal end 204 by means well-known in the art, such as by folding and stitching the structural restraint 212 around the attachment ring 182 (or each ring segment 183 in the relevant embodiment).

Attachment ring 182 includes an outer surface 184, an inner surface 185, a top surface 186, and a bottom surface 187. Attachment ring outer surface 184 is distal while attachment ring inner surface 185 is proximate the longitudinal axis 101 of the structural core's 100 cylindrical shape. In the preferred embodiment, attachment ring inner surface 185 is concentric with primary end ring area 149 and secondary end ring area 158. In the embodiment including ring segments 183 each ring segment 183 includes an outer surface 184, an inner surface 185, a top surface 186, and a bottom surface 187.

Attached to structural restraint 212 as previously disclosed, each attachment ring 182 is fixedly connected, by means well-known in the art such as bolting, to one of the end rings 116. In the embodiment including ring segments 183, each ring segment 183 is fixedly connected to one of the end rings 116. In the embodiment including solid attachment ring 182, attachment ring 182 is positioned on end ring 116 so that inner surface 185 abuts primary end ring area 149 along their respective circumferences. In the embodiment including ring segments 183, the complete inner surface 185 of each ring segment 183 abuts a corresponding portion of primary end ring area 149 with ring segment gaps 188 spacing the ring segments 183 from each other along the entire circumference of primary end ring area 149.

In this end ring second embodiment 192, the inner liner 206 and the plurality of bladders 208 of inflatable shell 200 are also sealingly attached to each end ring 116 at the inner circumference 402 of each semi-toroidal end 204. Specifically, the inner liner 206 is constrained between the secondary end ring area 158 of each end ring 116 and a seal ring 522. Inner liner 206 is thus preferably longer than structural restraint 212. Each seal ring 522 is attached to its corresponding end ring 116 at the secondary end ring area 158 by means of attachment well-known in the art, such as bolting similar to that of deadman retainer 408. Also in this embodiment, the thicker single bladder 211 is also sealingly constrained between the secondary end ring area 158 of each end ring 116 and seal ring 422, and is thus also preferably longer than structural restraint 212.

Seal ring 522 includes an inner surface 524, an outer surface 526, a top surface 528, and a bottom surface 530. Preferably, seal ring 522 has a generally rectangular cross-sectional area. Seal ring outer surface 526 is distal while seal ring inner surface 524 is proximate the longitudinal axis 101 of the structural core's 100 cylindrical shape. In this embodiment, seal ring inner surface 524 is concentric with secondary end ring area 158.

In addition, the diameter of seal ring 522 at the seal ring inner surface 524 is substantially equal to the diameter of secondary end ring area 158. Thus, seal ring inner surface 524 and secondary end ring area 158 abut each other throughout their respective circumferences and securely retain a portion of inner liner 206 therebetween.

Two annular seals 532 are disposed between seal ring inner surface 524 and secondary end ring area 158 in order to provide a sealing engagement to such abutment. To accommodate annular seals 532 therebetween, secondary end ring area 158 is provided with two annular seal grooves 534, each sized and constructed to hold an annular seal 532 therein.

A ring clip 189 is disposed in the area defined by inner liner 206, shoulder end ring area 164, and split ring bottom surface 187. Preferably, ring clip 189 and split ring 182 are sized and constructed so that inner liner 206 and thicker single bladder 211 form a smooth tangential surface from secondary end ring area 158.

Inflatable shell 200 may also include a plurality of view windows 505, as shown in FIG. 17. View windows 505 are sealingly attached to the layers of inflatable shell 200 in a manner similar to the attachment between inflatable shell 200 and end ring 116, as detailed herein.

Launch Restraint 400

The launch restraint 400, generally shown in FIG. 20, maintains the inflatable shell 200 in its collapsed and folded arrangement around the structural core 100 when module 10 is in the launch configuration 410. Launch Restraint 400 must be easily releasable so that an astronaut may readily detach the restraint 400 once module 10 is set to be converted into its deployed configuration 430. In a preferred embodiment, restraint 400 comprises a rip cord mechanism 450 which is released by a simple pulling motion and which once activated unwinds, by itself, from around inflatable shell 200.

Carrier 300

Figure 2:
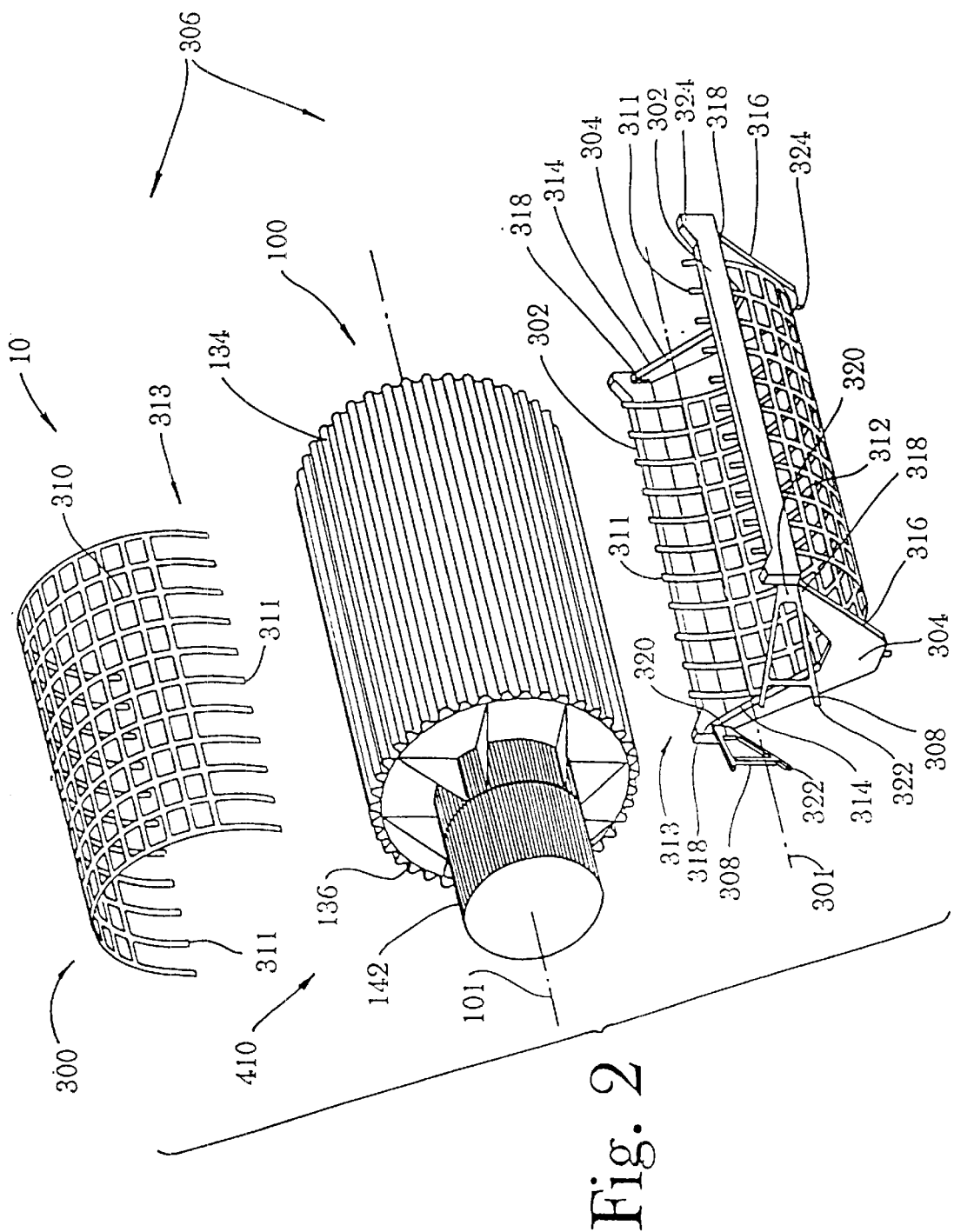
FIG. 2 is an isometric view of the module in the launch configuration, including the carrier.

As shown in FIG. 2, in the embodiment including carrier 300, module 10 is stored within a carrier 300 during its flight within the launch vehicle's payload bay. Carrier 300 provides a lightweight mechanism to transport the structural core 100 and inflatable shell 200 (in the launch configuration 410) into space onboard existing launch vehicles, such as the Space Shuttle. While providing such transportation, carrier 300 also isolates the structural core 100 from the large bending loads generated during the launch and ascent of the launch vehicle. In general, carrier 300 comprises at least two side beams 302, two end frames 304, a carrier webbing 306, and two thrust frames 308.

Carrier 300 preferably has the same general cylindrical shape of structural core 100 and inflatable shell 200, including a longitudinal axis 301.

Carrier webbing 306 provides the perimeter outline of the cylindrical shape. Preferably, carrier webbing 306 comprises a first carrier webbing section 310 and a second carrier webbing section 312, each having a semi-cylindrical shape. First carrier webbing section 310 and second carrier webbing section 312 are selectively attached at their free ends 311 by way of webbing section attachment means 313. The attachment of first carrier webbing section 310 to second carrier webbing section 312 at their free ends 311 thus produces the generally cylindrical shape of carrier 300.

At least two side beams 302 are attached to either one of the carrier webbing sections, 310 and 312. Each side beam 302 extends in the direction parallel to the longitudinal axis 301 of the carrier's 300 cylindrical shape. Preferably, a side beam 302 is attached adjacent each free end 311 of the corresponding carrier webbing section, 310 or 312. Also preferably, each side beam 302 is longer than the height of the carrier's 300 cylindrical shape so that each side beam 302 extends past both of the ends of the generally cylindrical shape of carrier 300.

Two end frames 304 are attached to each side beam 302, preferably one end frame 304 at each end of each side beam 302. Each end frame 304 is generally semi-annular in shape having an inner surface 314, an outer surface 316, and two end frame free ends 318. Preferably, each end frame free end 318 is attached to a side beam 302, at the end of each side beam 302.

Two thrust frames 308 are attached to one of the two end frames 304, one thrust frame 308 at each of the two end frame free ends 318. Each thrust frame 308 includes a first end 320 and a second end 322. Thrust frame first end 320 is pivotally connected to the corresponding end frame free end 318. With structural core 100 held by carrier webbing 306, thrust frame second end 322 is attached to the end of airlock 142 distal to end plate 106. The carrier 300 is attached to the payload bay transporter at launch trunnion connections 324.

In Operation

On earth, the module 10 is first assembled into its launch configuration 410. As previously disclosed, in the launch configuration 410, the thickness or interior of the inflatable shell 200, in particular the spacing layers 224 of M/OD shield assembly 214, is collapsed or shrunk by vacuum, and the inflatable shell 200 is deflated, collapsed, and efficiently folded around the structural core 100 and fairing 134. The launch restraint 400 maintains the inflatable shell 200 in its collapsed and folded arrangement around the structural core 100. It is also noted that inflatable shell 200 is already sealingly attached, as previously disclosed, to the end rings 116 in the launch configuration 410.

Once assembled into the launch configuration 410, the module 10 is positioned within the launch vehicle payload bay inside of an appropriate payload transporter. In an alternative embodiment, module 10 is positioned inside of carrier 300 and carrier 300 is positioned within the launch vehicle payload bay secured thereto as previously disclosed.

The launch vehicle next lifts off from earth towards lower earth orbit. Module 10 must adequately react the large loads and forces developed during lift off. Due to its interconnected and re-enforced design, module 10 is able to adequately react such forces and loads.

The forces and loads created during lift off are reacted by the structural core 100, specifically the longerons 102, body rings 104, endplates 106, end rings 116, shelves 114 (in their cruciform configuration 128), and airlock 142. The primary axial/longitudinal launch loads are reacted by such elements due to their interconnection as has been disclosed herein. This interconnection results in a direct and efficient load path for reacting the primary axial/longitudinal launch loads. The inertial loads created during lift-off by the support system structures 144, which are attached to the shelves 114 at this stage, are initially reacted by the shelves 114 and are passed on to the other elements according to the load path of the structural core 100.

It is noted that, as a result of the load path and their elongated shape, the longerons 102 are under generally compressive stress and tend to buckle during launch. As previously disclosed herein, a body ring 104 is attached at each pre-determined longeron 102 buckling mode node location thereby imparting sufficient lateral stiffness to the longerons 102 to prevent such buckling.

In the embodiment including carrier 300, carrier webbing 306 reacts the transverse payload inertial loads created during lift off. In addition, carrier webbing 306 evenly distributes such loads preventing high bending loads from being induced into the structural core 100. Side beams 302 react the payload transverse inertial loads which are passed through the carrier webbing 306 and transmit such loads to the launch trunnion connections 324. Furthermore, thrust frames 308 react the primary axial launch loads from the payload and also transmit these loads to the launch trunnion connections 324.

After lift off and once the launch vehicle has stabilized in orbit, the module 10 is now ready to begin its transformation from the launch configuration 410 to the deployed configuration 430. The payload bay doors are opened, the module 10 is taken out of the payload bay from its payload transporter (or carrier 300 in the relevant embodiment), and the module 10 is ready for deployment To deploy, the launch restraint 400 is unfastened from around the inflatable shell 200. The inflatable shell 200 will likely expand into a rough semblance of its deployed shape, a circular cylinder 202 with semi-toroidal ends 204. This initial expansion is partially due to the vacuum of space as well as the general structural shape provided by the spacing layer 224 of inflatable shell 200. In addition, in the embodiment including open cell foam, each open cell foam is collapsed or shrunk by vacuum evacuation for the launch configuration 410. Once the restraint 400 is released, the open cell foam will naturally return to its original thickness also aiding in such expansion.

The wall of inflatable shell 200 is then inflated by use of an inflation system. Specifically, the inflatable shell 200 is inflated by pumping a gas into the interior of the inflatable shell 200. The inflation system may be carried into orbit attached to one of the endplates 106 or within the launch vehicle payload bay. The inflatable shell 200 is inflated up to an atmospheric condition appropriate for human habitation. It is noted that the sealing connection provided by the end rings 116 between the structural core 100 and the inflatable shell 200 prevents gas from leaking out of the interior of the inflatable shell 200. It is also noted that during the inflation of inflatable shell 200, fairing 134 provides a clean interface to the inflatable shell 200 to prevent snagging and ensure a clean deployment.

At this point, the plurality of shape rings 218 are also inflated and properly placed on their respective hook and pile systems on inner liner 206. Not only do the shape rings 218 aid in maintaining the shape of inflatable shell 200, but they also provide mounting locations for removable shelves 114 and fairing 134 along the inner liner 206 thereby eliminating the potential for damage of the inflatable shell 200 and the plurality of bladders 208 therein.

Once fully inflated, the module 10 is in the deployed configuration 430 and has the shape of a circular cylinder 202 with semi-toroidal ends 204. The complete inflation of inflatable shell 200 creates pressure loads on the module 10 which, like the loads and forces created during lift-off, must also be adequately reacted by the module 10. Such pressure forces and loads are reacted primarily by the longerons 102, the endplates 106, the end rings 116, and the structural restraint 212. The interconnection between the structural restraint 212 and the end rings 116, the end rings 116 and the end plates 106, and the end rings 116 and the longerons 102 provides the necessary load path to adequately react such pressure loads.

In addition, because each of the bladders 208 is designed to be geometrically slightly larger than the structural restraint 212, the bladders 208, after full inflation of inflatable shell 200, are under minimal tension, if any. It should also be noted that the preferred shape of the module 10 was chosen to reduce the overall pressure loads acting on the module 10 once the inflatable shell 200 is fully inflated into its deployed configuration 430.

In the first embodiment 190 of end ring 116, each end ring 116 is designed to position the deadman 404 tangentially in line with the membrane forces of the structural restraint 212 placing the deadman retainer bolts 420 in shear instead of tension. This same load characteristic is apparent in the second embodiment 192 of end ring 116 in which the bolts connecting attachment ring 182 to end ring 116 are in shear instead of tension due to the relative parallel position between attachment ring outer surface 185, structural restraint 212, and primary end ring area 149.

Next, fairing 134 is converted from its first configuration 137 to its second configuration 139. In the first configuration 137, fairing 134 is disposed around the perimeter of the structural core 100. In the second configuration 139, fairing 134 is re-arranged to provide a suitable habitation and work environment to the interior of the inflatable shell 200. As previously disclosed, fairing 134 comprises two embodiments: a horizontal fairing 250 and a vertical fairing 135, each having its own distinct first and second configurations, 137 and 139.

For horizontal fairing 250, in its first configuration 252, each strut 256 is pivoted so that its strut body 262 is adjacent and parallel to longerons 102. Each floor segment 264 is attached to struts 256 that are immediately adjacent to each other on each body ring 104. Each floor segment 264 is partially folded onto itself between its corresponding struts 256.

In order to move the horizontal fairing 250 into its second configuration 254, the struts 256 are pivoted about their first ends 258 so that strut body 262 is normal to and strut second end 260 is distal to its corresponding body ring 104. When immediately adjacent struts 256 are placed in their second configuration 254, their attached floor segment 264 becomes taut therebetween.

In order to lock and solidify the horizontal fairing 250 in its second configuration 254, a shelf 114 is attached to the shelf-to-shelf attachment means 130 of two struts 256 that are in the same longitudinal plane (with reference to longitudinal axis 101). Such a connection prevents struts 256 from further pivoting motion thereby locking each strut 256 in the correct position. It is noted that because, in the preferred embodiment, at least one cruciform pattern component 129 extends the distance between two adjacent body rings 104, at least one set of shelves 114, those that comprise such cruciform pattern component 129, are the correct size to be attached between two struts 256 in the same longitudinal plane. The the same longitudinal plane. The removal of shelves 114 from their cruciform configuration 128 will be disclosed herein.

In its first configuration 141, vertical fairing 135 completely encloses and surrounds structural core 100. In order to move vertical fairing 135 from its first configuration 141 to its second configuration 143, vertical fairing 135 is first detached into the plurality of curved fairing segments 138. Because vertical fairing 135 is constructed from a bent but naturally flat material, when the vertical fairing 135 is detached into its components, each fairing segment 138 returns to its natural, unstressed flat disposition.

Each fairing segment 138 is then moved so that it extends radially between a longeron outer surface 103 and the inflatable shell 200. Longeron-to-fairing segment attachment means provides selectively releasable attachment to longeron 102 and fairing segment 138.

From FIGS. 8 and 9, it can be seen that horizontal fairing 250 in its second configuration 254 provides module 10 with a living space that is divided into "floors", with definite up and down orientations. On the other hand, from FIGS. 6 and 7, vertical fairing 135 in its second configuration 143 provides module 10 with a living space that is divided into "quadrants" around structural core 100, with no definite up or down orientations.

The last step in transforming the module 10 into its deployed configuration 430 is the re-arrangement of the shelves 114 from their current cruciform pattern 128 to an arrangement suitable for human habitation and work within inflatable shell 200. Each shelf 114 that is to be moved must first be detached from the other shelves of the cruciform pattern 128. This detachment is easily performed by detaching the shelf-to-shelf attachment means 130 of the shelf 114 to be moved. The removed shelf 114 is then moved to its re-arranged position, as partially shown ins FIG. 9, and attached in such position by mateable attachment between the shelf-to-shelf attachment means 130 and a strut-to-shelf attachment means (if attached to a strut 256), a fairing-to-shelf attachment means (if attached to a fairing 134), a shelf-to-shelf attachment means 130 (if attached end to end to another shelf 114), or a shelf attachment point 120 (if attached to the body of another shelf 114).

Figure 21:
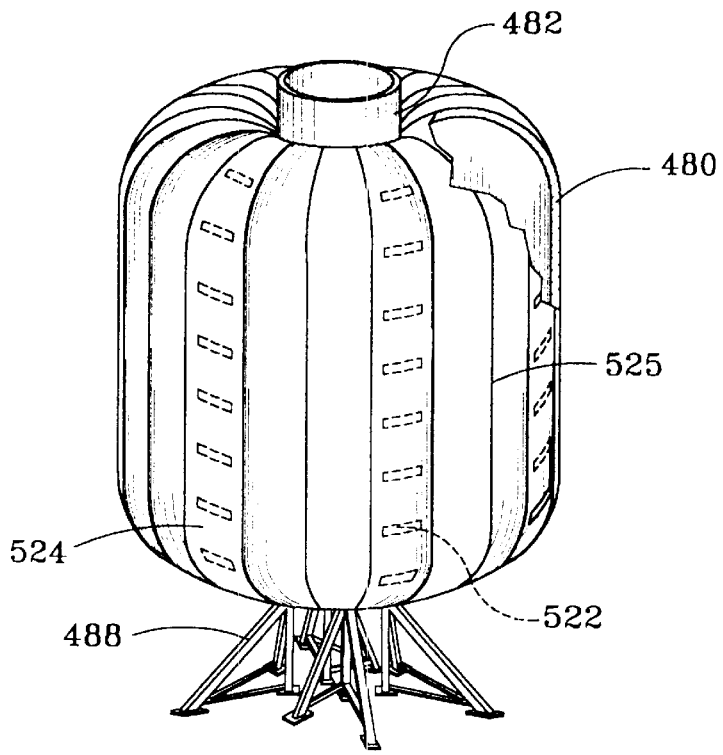
FIG. 21 is a simplified view of the vessel according to the present invention, showing deployment straps in every third gore, and a portion of the flexible shell.

The module or pressure vessel of the present invention may withhold a relatively high pressure of the internal fluid, such as air or other gas or liquid, and may be made to any desired shape and size. The vessel 480 as shown in FIG. 21 is shown in its inflated configuration, and includes a rigid core 482 and an inflatable shell. More particularly, the vessel 480 integrates a rigid core with an inflatable shell, as explained further below. The rigid core 482 may be formed from a metallic or composite material. Only the upper tunnel portion of the rigid core is shown in FIG. 21. The core 482 may be provided with a plurality of circumferentially spaced longerons (not shown) for additional framing support, as explained above. The vessel 480 as depicted has central vertical axis, and is supported on a suitable legs 488.

Depending on the desired design, the vessel may include a cylindrical section of a flexible material, capped by a flexible material dome on one end and a metallic or composite hatch at the other. Alternatively, the vessel may include an extruded annulus, where the exterior cylinder and transitioning torroid regions are formed from flexible materials, and the interior cylinder is rigid capped by two rigid bulkheads. The flexible shell may have a torroid shape with no cylindrical region, a spherical shape, a pure cylinder shape with no torroid region, or any combination of the above. In yet another embodiment, the vessel may have no rigid core and only a flexible shell with one or more shell pass throughs for access. An optional structural core and/or a system of collapsible tension members may also be incorporated into the design.

The rigid core, if used, may provide an interface for easily accessing the interior of the pressure vessel, and may also provide a mechanism for maintaining the desired shape of the inflatable shell. The vessel pass through may be provided within the rigid core. If no rigid core is provided, the vessel will include one or more structural pass throughs. The core also may provide a rigid structure for the mounting and pre-integration of equipment into the pressure vessel. During manufacture, the rigid core may thus be completely outfitted with equipment prior to packaging the shell, and thus prior to transporting and deployment at its final destination. The interior volume may be accessed, for example, through an airlock attached to the central structural core. Alternately, a pressure bulkhead may be provided at either or both ends of the core to accommodate hatches for personnel access and utility penetrations. The bulkheads may be connected by structural longerons that retain the bulkheads in their required location. Since the inflatable shell is attached to the bulkheads, the shell ends may also be retained in their desired shape.

A suitable vessel when deployed may have a diameter of approximately 25 feet and a height of approximately 23 feet. Prior to deployment, the diameter may be approximately 14 feet. The vessel may, for example, withstand an internal pressure of up to 60 psi. As explained further below, the inflatable pressure vessel may be designed to be particularly well suited to reacting to high pressure stresses. The vessel according to the present invention thus has a large interior when inflated, yet is compact, light weight, and reliable. The inflatable shell 200 has two primary components, a restraint layer and a bladder. The restraint layer is the structural carrying load member which reacts as a membrane to the entire pressure load. The bladder is the impermeable member of the vessel, and keeps the internal fluid, such as air, from penetrating through the shell of the pressure vessel. The inflatable shell may be folded around the rigid core, which may be designed to withstand high structural loads.

The vessel may be easily and reliably folded for storage and/or transport, and subsequently inflated to obtain its vessel storage configuration, as shown in FIG. 21. When there is no internal pressure, the restraint layer and bladder may be packaged around the central structural core for reducing the size of the vessel for storage and shipping. The vessel may be deployed in the reverse fashion as it was folded simply by adding internal pressure. The pressure inflated vessel thus obtains its full shape, as shown in FIG. 21, when it reaches its destination.

The restraint layer and bladder layer are the primary components in designing and building an inflatable pressure vessel capable of withstanding high loading according to this invention. These components and other primary components of the highly loaded inflatable pressure vessel are discussed below. Additional components may be required depending on the specific design application.

Structural Restraint Layer

Figure 22:
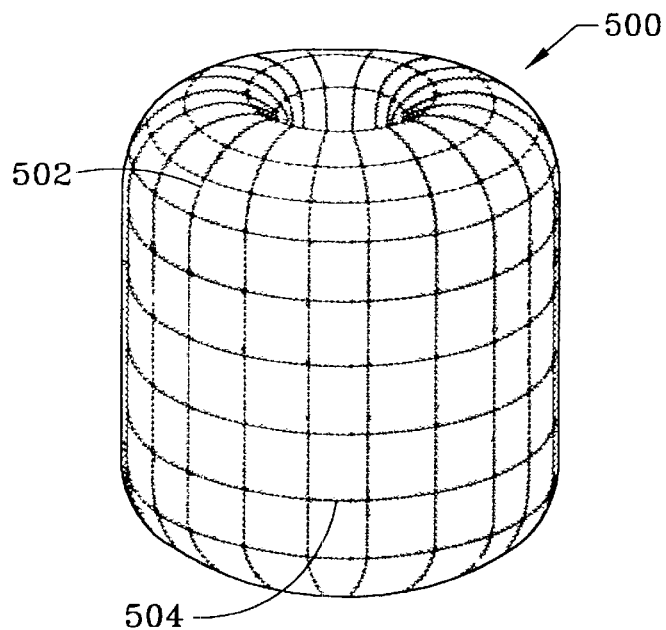
FIG. 22 is a simplified pictorial view of the vessel restraint layer, illustrating indexing longitudinal and indexing hoop straps.
Figure 23:
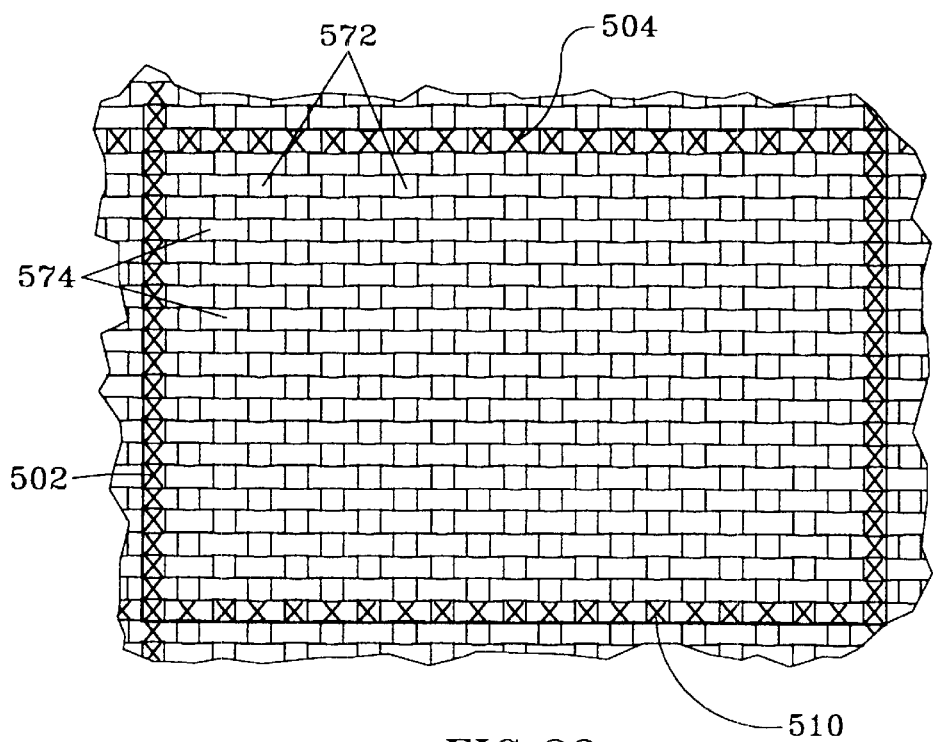
FIG. 23 is an expanded view of a portion of the restraint layer shown in FIG. 22, illustrating the weave and index stitching.

The structural restraint layer may be fabricated from various high strength flexible materials, and preferably either a fabric material, a flexible metallic material (including strips and/or cables), or a composite material. The restraint layer 500 as shown in FIGS. 22 and 23 is comprised of high-strength fabric straps, which may be formed from a Kevlar, Vectran or PBO narrow webbing material. FIG. 23 is a detailed view of the fabric straps, and illustrates indexing stitches which are shown in FIG. 22. As shown in FIG. 23, the fabric preferably has a woven webbing design, with both longitudinal webbing straps 572 and hoop webbing straps 574. Longitudinal straps may be woven with hoop straps to optimize the design and load capability of the restraint layer.

The indexing stitch 510 as discussed subsequently secures the indexing longitudinal and hoop straps together, and series of these indexing stitches form longitudinal stitch seams 502 and hoop stitch seams 504, which are also discussed further below. Each indexing stitch 510 as shown has an x-shaped stitch pattern to secure one hoop strap 574 to one longitudinal strap 572 at the location of the stitch. The stitch pattern for connecting a hoop strap with a longitudinal strap at the location of their cross-over may have various shapes or configurations. The structural restraint layer 500 may thus be woven into a desired cylindrical, toroidal, or other pressure vessel shape.

The restraint layer weave as shown in FIG. 23 is comprised of flexible fabric straps that have a selected and uniform width. This weave formed by the hoop straps 574 and longitudinal straps 572 may be a traditional bi-directional "over and under" or plain weave, or a more complicated weave. This weave pattern when combined with the indexing stitches 510 effectively secures the straps into place so that they cannot move out of position, thereby simulating a continuous structure. The weave pattern may be designed to accommodate the geometry of the vessel and equalize the stress distribution among the fabric straps. The straps of the weave are referred to as longitudinal straps and hoop straps perpendicular to the longitudinal straps. The "longitudinal" or "hoop" terms should be broadly construed, however, particularly since the vessel need not have a rigid core defining the longitudinal axis of the vessel. When the weave is connected to a shell pass through as discussed subsequently, any strap may be considered a longitudinal strap, while the generally perpendicular strap may be considered a hoop strap.

A weave for the restraint layer also permits the use of different strength straps which are tailored to the direction of the loading, thereby providing for an optimized structure. The restraint layer 500 is light weight, and the interconnection of the restraint layer with the bladder (as explained subsequently) provides for an overall light-weight shell. The restraint layer 500 also permits the integration of hard structures, such as windows, at selected locations within the inflatable shell. The woven design of the restraint layer provides a long lasting structure with a minimal weight.

The woven construction of the restraint layer 500 further permits relatively simple, low cost manufacturing techniques to be used. The restraint layer may be assembled without the use of special tools, machines, or fixtures. The straps may simply be woven into place by hand. Also, the woven restraint layer 500 may be easily repaired during this manufacturing process. If a woven strap needs to be replaced, it is a simple procedure to slip it out and re-weave a new one in its place.

The hoop straps and longitudinal straps may be fastened together to hold the weave pattern into position by a. nylon hand stitch 510, as shown in FIG. 23. Various types of fastening devices other than stitching may be used to connect a hoop strap to a longitudinal strap, although stitching is an easy, reliable, and low cost fastening mechanism. As shown in FIG. 23, the weave preferably is stitched together along a series of locations where the longitudinal straps and the circumferential straps cross, thereby forming longitudinal stitch seam 502 and hoop stitch seam 504. Stitching is also desired to maintain the proper shell shape when the pressure vessel is packaged for transportation or storage.

The fastening device 510, which preferably is used at selected intervals about the entire restraint layer, insures that the fabric straps in the weave of the restraint layer 500 stay in their correct position. The fastening device 510 may include materials such as nylon, and preferably may be designed to withstand a lower yield loading than both the longitudinal straps and the hoop straps of the load carrying restraint layer. This allows each fastening stitch 510 to breakaway if loaded excessively, precluding destruction of the restraint layer fabric straps. The fastening device 510 may be used, in sufficient quantity, incrementally on the restraint layer weave as shown in FIG. 22 to insure that the woven structure maintains its desired shape. In addition, the fastening device 510 may be used around any weave terminating boundaries of the restraint layer, thereby keeping the restraint layer fabric straps at the boundaries in place.

Figure 24:
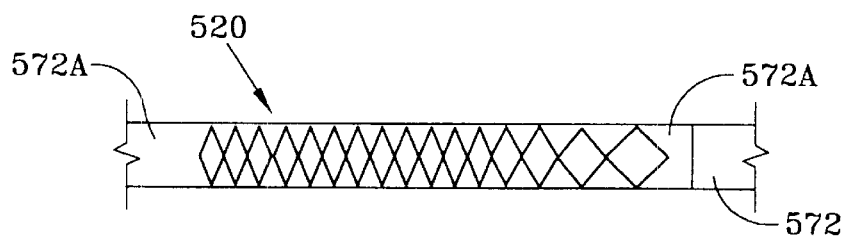
FIGS. 24 and 25 are top views of a tapered diamond seam pattern.

A fastening device to connect an end of a strap with the same strap and thereby form a loop may be made using a high efficiency seam, such as the double stitch row or tapered diamond seam pattern 520 shown in FIG. 24. Seam 520 thus connects a portion of an elongate strap 572 with an end portion 572A of the same strap, thereby forming a loop at the end of the strap 572. Gradually reducing the distance between successive rows of the seam stitching allows the individual fibers in the webbing to shift relative to one another. This shifting of fibers within the seam provides an even load distribution to gradually transfer the load throughout the webbing. For the FIG. 24 stitch configuration, loading is anticipated to the right of the figure, and accordingly the right side rows of stitching are spaced farther apart. This stitch pattern may be used, for example, to stitch together a single strap to form a loop which passes around a roller positioned to the left side of the stitch 520. When the strap end 572A is positioned on top of the same strap 572 and stitched together by weave 520, the strap is connected to the roller. The pulling forces will primarily act on the right side, spaced apart stitches more than the left side, closely spaced stitches. The spaced apart right side stitches experience the strongest pulling forces, and those forces are gradually reduced by the right side stitches so that the closely spaced left side stitches reliably hold the loop together. Typically structural seams in high strength webbing have seam efficiencies that vary from 50% to 70% or less, meaning that each seam is at least 30% to 50% weaker than the general strap strength. The tapered diamond seam as shown in FIG. 24 may provide greater than 90% of the strap material strength.

Figure 25:
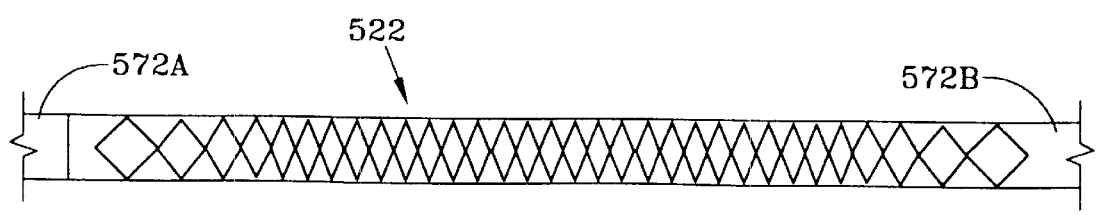

In the FIG. 25 configuration, substantially equal loading to the left and the right is anticipated. This tapered diamond seam stitching 522 may thus be used to join together the ends of two elongate straps 572A and 572B, thereby effectively forming a single structural strap. Strap 572B is thus placed on top of strap 572A, and the stitching 522 secures the straps together. In a similar manner to the stitch 520, the spaced apart stitches at the ends are provided to partially absorb the high pulling forces, so that the closely spaced interior stitches which tightly hold the straps 572A and 572B experience less pulling forces.

Figure 26:
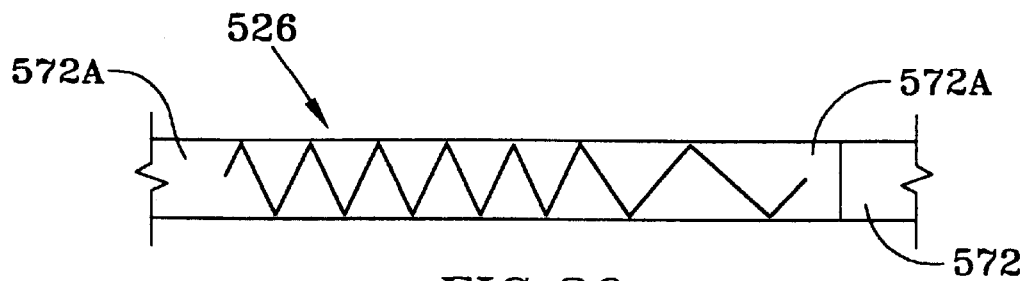
FIGS. 26 and 27 are each simplified views of alternate embodiments of seam patterns.
Figure 27:
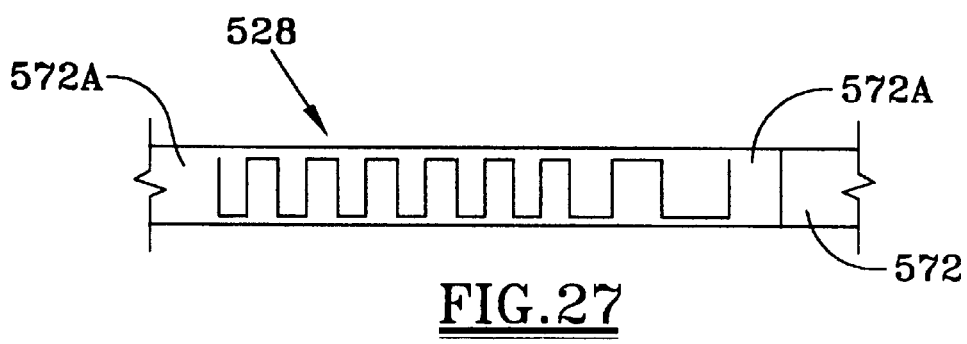

The single row stitch seam pattern 526 shown in FIG. 26 and the square weave seam pattern 528 shown in FIG. 27 are alternative designs to the tapered diamond stitch pattern shown in FIG. 24. If theses stitch patterns are used to interconnect ends of two elongate straps to form a single structural strap, the stitching at both ends of the seams preferably would be spaced farther apart, while the interior stitches of the seams would be placed more closely together, as shown in the FIG. 25 embodiment.

The restraint layer 500 is woven so that the gap between adjacent longitudinal straps or between adjacent hoop straps is small at any point on the flexible shell, even though the largest diameter of the inflated shell may be twice the diameter of the shell where it is attached to the solid core. This goal may be accomplished by creating a single loop out of every two adjacent longitudinal straps. Each longitudinal loop transitions from a single strap thickness at the larger diameter to a double strap thickness at each end of the loop where the strap passes around a clevis roller, as explained below. The devises thus may be used to attach the longitudinal straps to the central structural core. Since the restraint layer does not have to provide a pressure seal, this interface may be optimized as a structural connection. The bladder seal is thus not a load path in the shell.

The vessel thus provides a large highly loaded inflatable pressure vessel that integrates a flexible shell with a rigid gore. The efficient restraint layer seams permit a lighter overall shell weight, and the woven design permits tailoring the structure to optimize the weight. Longitudinal straps loop around device rollers to permit equal load sharing in two adjacent longitudinals. The restraint layer design also permits integration of a hard structure pass through, such as a window, to the inflatable shell.

Bladder

FIG. 18 illustrates the various layers of a flexible shell, including the restraint layer 212 and bladder layers 208. The bladder 600 as discussed herein may consist of one or several bladder layers 208 with bleeder cloth layers 210 spaced between adjacent layers, as shown in FIG. 18. The bladder is the primary gas barrier layer that maintains the gas in the inflated vessel. For many applications, a very low bladder permeability rate may be required to minimize re-supply of gas, such as air, to maintain the vessel fully inflated. The bladder 600 is slightly oversized when compared to the restraint layer 500 in order to prevent the bladder from carrying any loads. The bladder 600 may be fabricated from many flexible impermeable materials, such as thin film polymers.

As shown in FIG. 18, an inner liner or protective barrier 206 may be added to help protect the bladder 600 from internal or external environments. The function of the inner layer 206 is to protect the bladder 600 from internal hazards by providing a barrier that is durable and puncture resistant. The inner layer 206 may also be flame resistant, easy to clean, and have good sound suppression properties. FIG. 18 shows three redundant bladder layers between the inner layer and the restraint layer 212. The bladder may be comprised of a single layer or multiple layers. Depending on its particular application, the bladder 600 may be designed to emphasize its impermeability, durability, and/or flexibility features. The bladder 600 should be flexible during the manufacturing, assembly, folding and deployment environments.

A single layer bladder is typically easier to design and manufacture but does not have the benefits of redundancy. Adjacent bladder layers allow for sealed compartments between bladder layers. Although this adds complexity to the design and manufacturing, the multiple layer design helps in isolating leaks and may reduce rework due to manufacturing errors.

For large applications, all layers of the bladder should be oversized compared to the restraint layer and fastened directly or indirectly (through intermediate bladder layers) to the restraint layer 500 and possibly the inner liner 206. This will prevent the bladder 600 from shifting out of position and taking load during deployment. The fastening systems as discussed below are able to properly position the bladder 600 without excessively loading the bladder 600 locally at the fastening locations.

Figure 34:
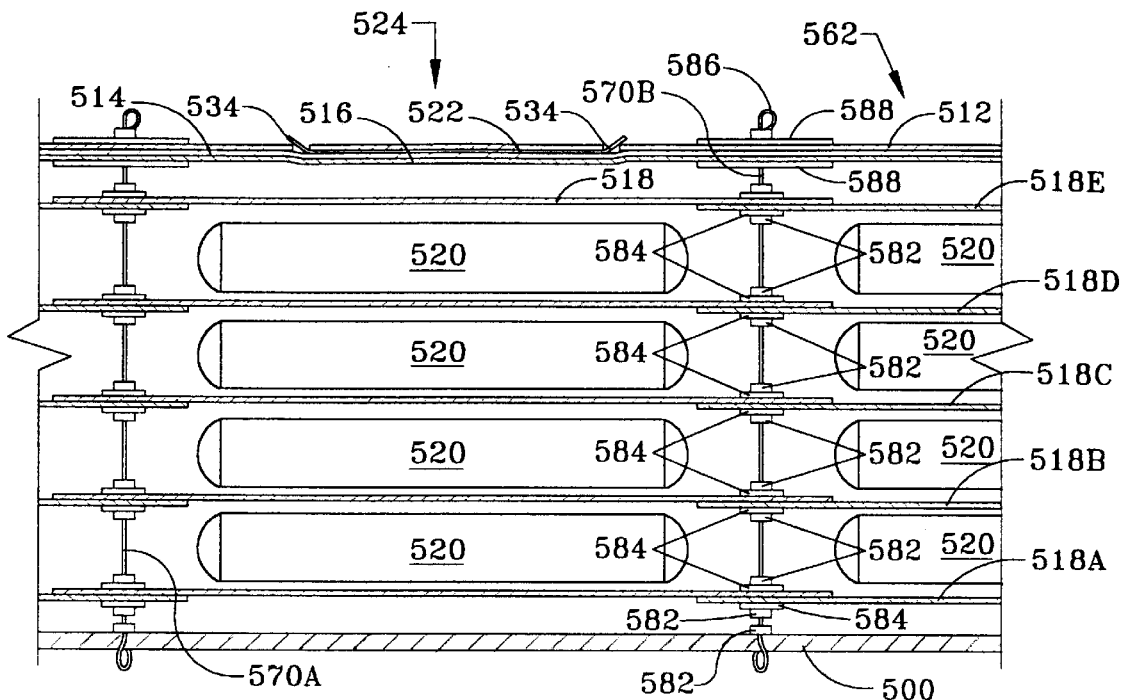
FIG. 34 is a simplified view of the shell gore-to-gore and layer-to-layer attachment layout according to the present invention.

FIG. 34 illustrates the various layers other than the bladder layer(s) and inner layer which may form the flexible shell of the vessel according to the present invention. These layers may include an outer Atomic Oxygen (AO) protection cover 512, a deployment system layer 514, and a Multi-Layer Insulation (MLI) layer 516, and a plurality of Micro-Meteoroid and Orbit Debris (MMOD) shielding layers 518 with foam layers 520 therebetween. Each of these layers is discussed in further detail below. These layers, when combined with the restraint layer and the bladder, thus form a suitable flexible and inflatable shell which defines the outer boundary of the inflated vessel.

Fastening System

Figure 28:
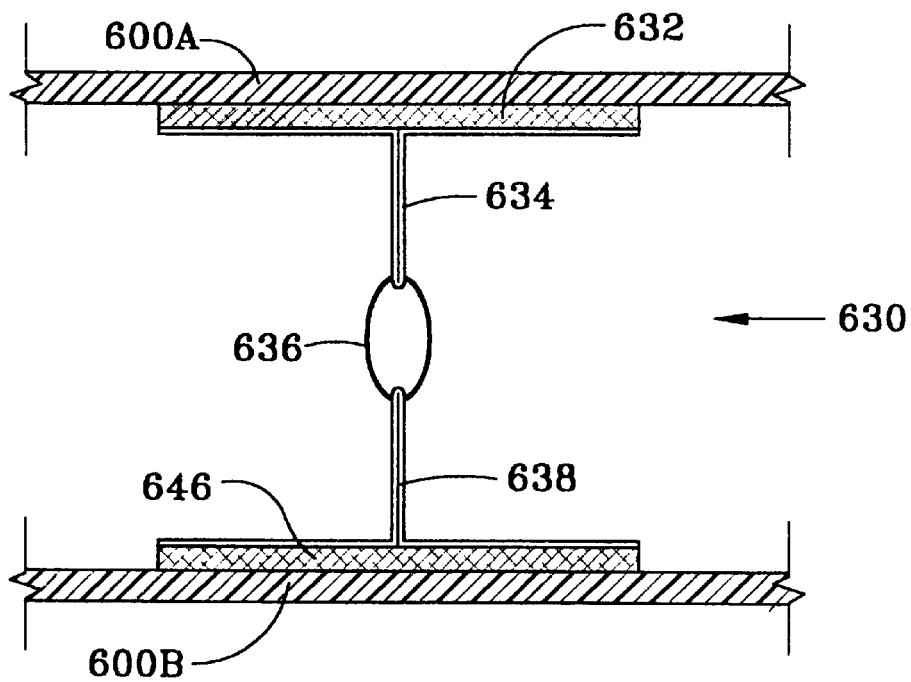
FIG. 28 illustrates components for fastening one bladder layer to another bladder layer.
Figure 31:
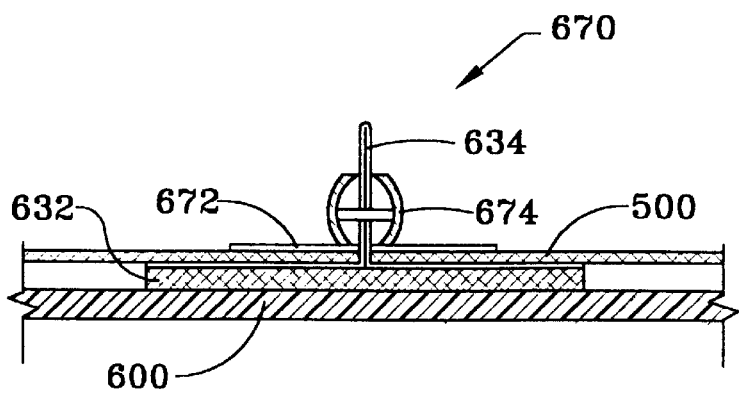
FIG. 31 illustrates components for fastening a bladder layer to the restraint layer.

The bladder fastening system 630 as shown in FIG. 28 illustrates one device which may be used to fasten together the various layers of the bladder to ensure that the bladder layers stay in their correct position with respect to each other. The fastening system 670 as shown in FIG. 31 may then be used to connect the outermost bladder layer to the restraint layer 500, so that all the bladder layers are maintained in their position with respect to the restraint layer.

Figure 29:
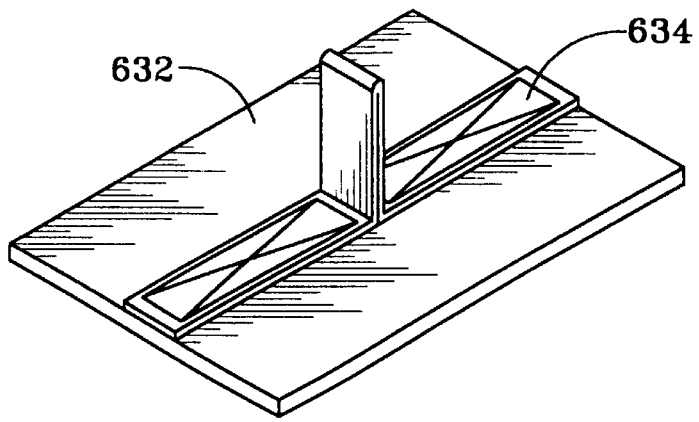
FIG. 29 illustrates a suitable bladder fastening patch and tab.

As shown in FIG. 28, a bladder fastening patch 632 may be bonded with an adhesive to the exterior surface of bladder layer 600A. A bladder tab 634 previously was sewn, stitched, or otherwise secured to the bladder-fastening patch 632, as shown in FIG. 29. A similar patch 646 may be bonded to another bladder layer 600B, and a similar tab 638 previously sewn or otherwise secured to the patch 646. Each tab 634, 636 may be comprised of a fabric strap, such as nylon, which is sewn to a respective felt pad patch 632, 646, which may be comprised of a Kevlar bleeder cloth. A restraint cord or tie 636 may then be used to fasten together the bladder tab 634 with the bladder tab 638.

The bladder layers 600A and 600B may thus be attached as shown in FIG. 28, with the fastening tabs 634, 638 designed to separate from the bladder layers 600A, 600B, respectively, before tearing or otherwise damaging the bladder layers. In an exemplary embodiment, the bladder fastening system 630 may be bonded to the bladder layer at approximately 3 foot intervals in both the hoop and longitudinal directions, thereby securing a first bladder layer to a second layer, and similarly a second bladder layer to a third bladder layer.

Figure 30:
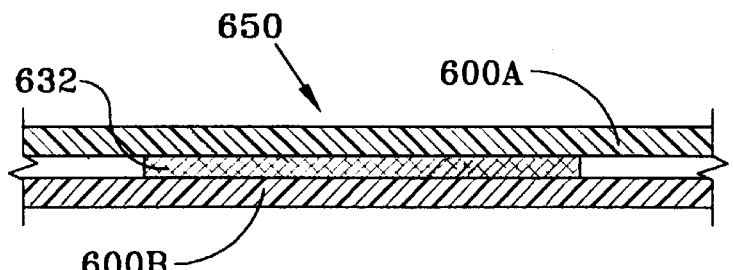
FIG. 30 illustrates a felt pad for fastening one bladder layer to another bladder layer.
Figure 36:
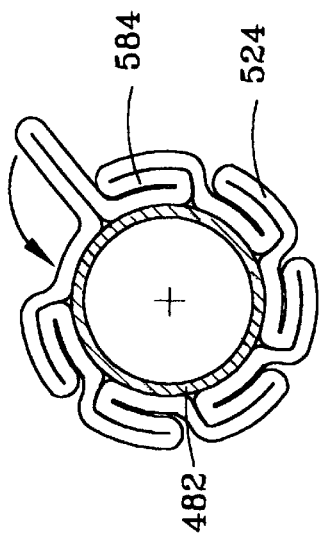
FIGS. 35 and 36 simplistically depict a shell folding scenario according to the present invention.

As shown in FIG. 36, a simplified bladder fastening system 650 may be used to connect bladder layer 600A to bladder layer 600B at the same selected intervals, thereby replacing the bladder fastening system shown in FIG. 28. For the FIG. 30 embodiment, each side of the bladder fastening patch 632 is bonded with an adhesive to one of the bladder layers. The patch 632 fails before damage to either of the bladder layers.

For both embodiments, the felt pad material of the patch may slowly begin to separate when excessive forces are applied, but if those forces are then reduced or eliminated, the entirety of the patch need not tear away from the bladder. Partial separation of the patch from the bladder is thus possible and, in some cases, likely. Each of the bladder fastening systems 630, 650 may allow the bladder to patch adhesive interface to break away if loaded excessively, thereby precluding destruction of the bladder layers. Each of the patches 632, 646 may thus slowly tear away from its respective bladder layer, either at the adhesive or bond connection to the bladder or preferably within the thickness of the material of the patch 632, 646. Both designs prevent the bladder layers from tearing at the location of the bladder fastening system, thereby maintaining impermeable bladder layers.

The bladder fastening systems 630, 650 as discussed above are relatively easy to assembly and repair. A plurality of circumferentially spaced bladder fastening patches may be bonded to a generally stationary interior bladder layer, with the outer bladder layer folded back to expose the circumferentially spaced fastening patches for connection of the two bladder layers, as discussed above. Thereafter, another 3 foot portion of the folded back outer bladder may be moved alongside the generally stationary inner bladder, and another plurality of circumferentially arranged patches secured to the bladder layers to connect the bladder layers at the selected interval. The fastening system 650 is particularly simple, and does not create significant bulges between the bladder layers.

A bladder fastening system 670 as shown in FIG. 31 may be used at desired increments between the outermost layer of the bladder 600 and the restraint layer 500. In this case, a patch 632 may be bonded to the outermost bladder layer, with a tab 634 sewn to the patch 634 and extending through a slight gap between the straps of the restraint layer 500. A disc 672 having a small slit therein may then be placed over the tab 634 and on top of the restraint layer 500. A short stud or other stop 674 may then be passed through an aperture in the tab 634 to secure the disc in place, thereby securing the bladder layer 600 to the restraint layer 500. As discussed above, the patch 632 is formed from a material which will tear and allow separation of the bladder 600 from the tab 634 and thus the restraint layer 500 before damaging the bladder layer.

Fastening systems 630, 650 and 670, in addition to being used incrementally to ensure that the bladder layers stay in their correct position with respect to the restraint layer, may also be used around terminating boundaries, such as a shell pass through, thereby keeping the bladder in position with respect to the restraint layer. The bladder is intentionally separate from the restraint layer so that the restraint layer can be optimized for strength and the bladder optimized for permeability, resulting in a superior overall design. The restraint layer may be secured to the rigid core or shell pass through, as explained subsequently, while the bladder is sealed to the rigid core or pass through, with no concern for the sealing mechanism between the structural shell or the pass through frame and the restraint layer. Also, a seal between the bladder and the rigid core or shell pass through is not along the shell load path, so that the bladder seal may be optimized.

Restraint Layer to Core Interface

The interface between the inflatable shell and the rigid core may be one of the most critical areas, since this is where the bladder 600 maintains a leak tight seal and the restraint layer 500 reacts to the shell load into the rigid interface. Preferably the bladder and restraint layer are independent so that the interface attachment may be independent to prevent the bladder from getting loaded by the restraint layer. The restraint layer/rigid core interface thus transitions any high load between the flexible fabric structure and a rigid core.

Figure 32:
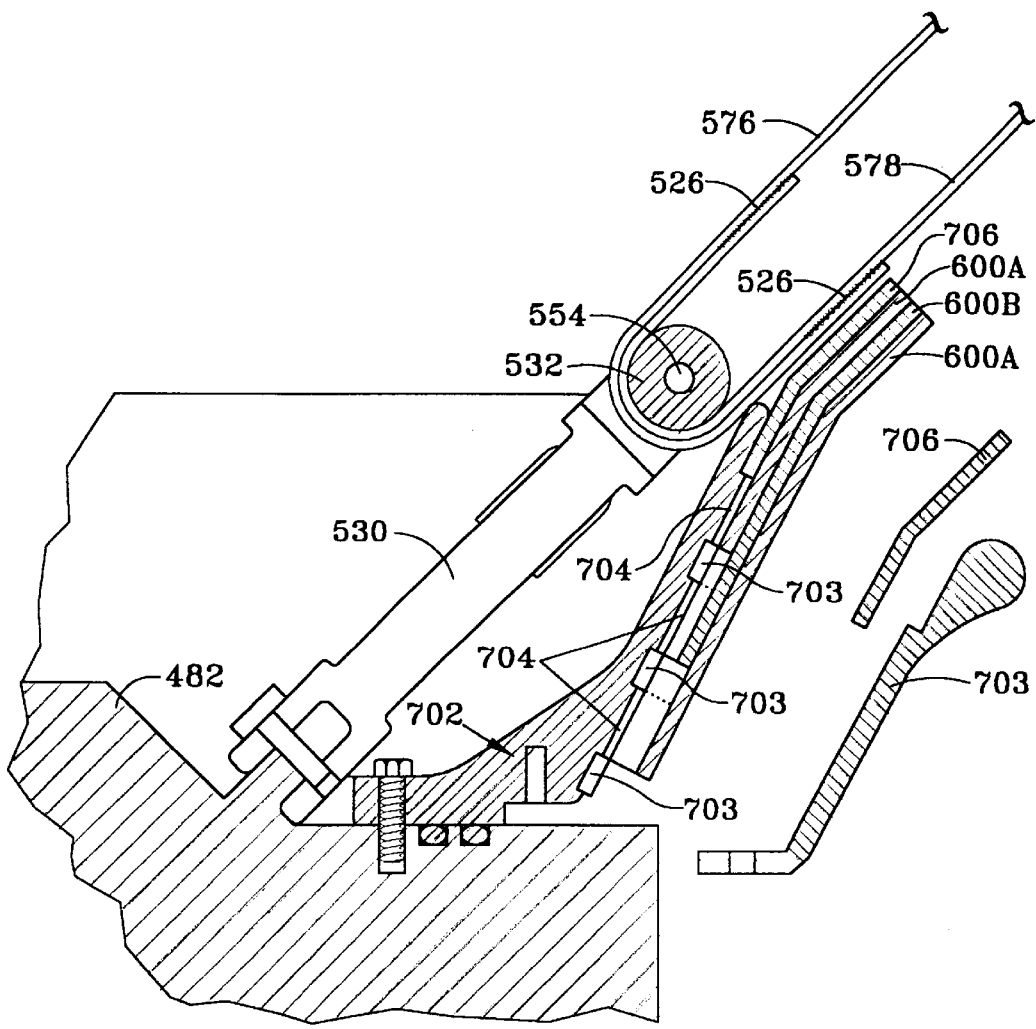
FIG. 32 is an exploded view of components for sealing bladder layers to a bulkhead of the vessel, and for connecting the restraint layer to the bulkhead.

Referring again to FIG. 21, the vessel 480 includes a rigid central structural core 482 and an inflatable shell 484. The rigid structure may also include components, such as a window, a hatch, or other interface spaced by a portion of the flexible shell from the interior core 482. A series of closely spaced devises 530, each with a roller 532 as shown in FIG. 32, may be used to fasten the fabric straps of the woven restraint layer 500 to the rigid structure, whether that be the core 482, a bulkhead or other rigid structure. The clevis 530 may be bolted or may be manufactured directly into the rigid structure.

Pin 554 allows the roller 532 to easily turn relative to the clevis 530, thereby providing equal loading in both straps of the loop formed by the strap passing around the roller. Using rollers thus allows uninhibited load sharing between the top and bottom of the fabric straps of the loop, which allows the straps to self-adjust to provide an evenly distributed load and evenly distributed stresses. Rollers having a radius at least five times greater than the fabric strap thickness may be used to prevent creasing of the strap. This also reduces the stress concentrations within the strap at that interface. A plurality of similar devices 530 each with a roller 532 may be provided for connection to each end of the loop formed by two adjacent straps of the restraint layer 500. Staggered devices may be used, if desired, to reduce the gap between adjacent straps. An alternate design to the clevis and roller arrangement shown in FIG. 32 may include wrapping the fabric strap around a smooth round slot or boss on the rigid structure. The fabric strap may then be woven or sewn back into the restraint layer.

For restraint layers fabricated from narrow webbing, e.g., one to two inches wide, the restraint layer interface with the rigid structure may thus be made using one clevice/roller assembly to attach each longitudinal restraint strap to the rigid core, with the strap forming a loop to wrap around opposing rollers at each end of the loop. Several important features are included in the interface between the restraint layer 500 and the rigid core 482. A first elongate strap 576 may wrapped around the roller 532 then its end attached by a seam 522 to elongate strap 578. Strap 578, in turn, wraps around the same roller 532 and is attached near its end by a second seam 522 to strap 576. The loop formed by the connection of the two strap 576 and 578 allows both straps to pass around the roller 532 for added strength. Each seam 522 is rated for greater than 90% of the rated strength of the straps 576, 578. The weave pattern as discussed above for the restraint layer is designed such that the longitudinal straps of this loop have no gap or very little gap between adjacent webbing straps. Whether there is a gap and the size of any gap is a function of the shell geometry when inflated, and the number and thickness of the straps.

An alternative restraint layer interface with the rigid core uses a conical compression ring that the restraint layer strap wraps around. As the load on the restraint layer increases, the pressure load on the ring and attached interface with the strap increases. An advantage of this compression ring attachment is that while the load increases, the conical ring reacts to load in hoop tension. A significant disadvantage of this compression ring attachment is that it may not provide good load sharing across and around the restraint layer because the restraint layer is being compressed against the interface, which in turn could damage the restraint layer.

Since the bladder layer and the restraint layer preferably are independent, the interface between the restraint layer and the core prevents the bladder from getting loaded by the restraint layer.

Bladder to Core Interface

In a preferred embodiment, at the location where the bladder 600 terminates to a hard structure, such as a core 482 or a bulkhead as shown in FIG. 32, each of the redundant bladder layers that comprise the bladder 600 may be attached to interface ring 702 via a bond 704, as shown in FIG. 32. Gaskets 703 may be used to separate the thin silicone bonds from the different layers 600A, 600B, 600C of the redundant bladder 600. The gaskets 703 thus serve as a dam to maintain the adhesive in place prior to curing.

The interface ring 702 may be sealed to the hard structure or the core 482 using conventional sealing methods, such as o-rings 705. A peel guard 708 prevents the bladder assembly from peeling back during handling and assembly of the vessel. Interior and exterior silicone buffer layers 706 may be provided on each side of the bladder to gently sandwich the bladder therebetween. These layers 706 may be located and bonded to the end of the interface ring 702 so as to provide protection to the bladder and bridge the gap to the structural restraint layer. A multitude of ports may penetrate the interface ring 702 so as to selectively vent the voids between the redundant bladder layers during manufacture of the vessel and to monitor the pressure between the bladder layers after assembly. A bleeder cloth (not shown) may be provided between the various bladder layers.

Figure 33:
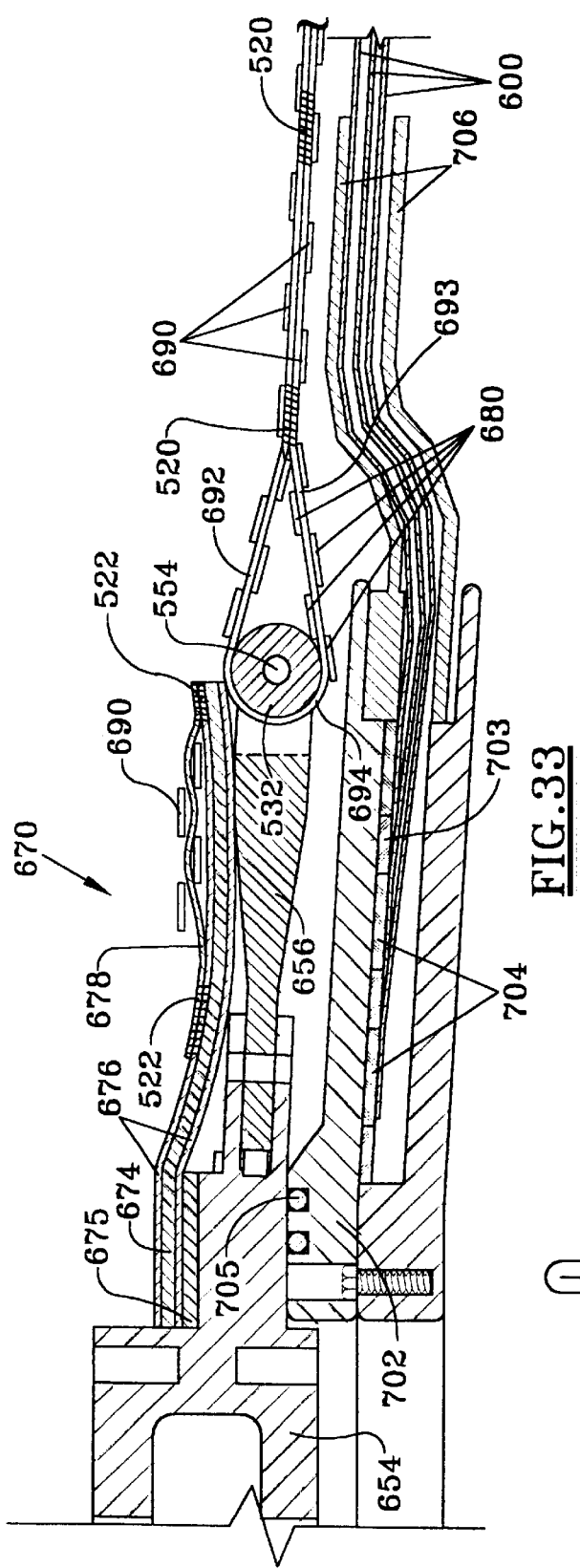
FIG. 33 is a detailed cross-sectional view of a restraint layer and bladder layers attached to a pass through frame.

This method of sealingly attaching the bladder 600 to the rigid structure may be used for any location where the bladder terminates to a hard structure, such as a window or a fluid servicing connection. FIG. 33 shows this same sealing technique at another location in the module for sealingly attaching the bladder 600 to the rigid frame 654.

There are also numerous design solutions to sealing the bladder interface. As one option, the bladder may be attached to the interface ring using a tapered ring, with conventional bore seals, face seals or a metal seal. The bore seal typically will have tighter tolerance requirement than a face seal. With any of these seal designs, there should be no long term cold flow effects of the bladder due to the compressive loads of the o-rings at expected temperature ranges. The bladder interface preferably is made by bonding the bladder to a metallic interface ring using a flexible sealant. The interface ring may then be sealed to the core using conventional o-ring seals, such as seals 705 shown in FIGS. 32 and 33. Oversizing the bladder and intermittently interconnecting the bladder layers to the restraint layer as discussed above will maintain a zero stress environment for the bladder seal interface with the rigid structure.

Shell Pass Through

When a structural pass through the flexible shell is desired, such as a window or a fluid servicing connection, a structural pass-through frame with frame clevises along its entire perimeter may be utilized. The structural restraint layer 500 thus may terminate at the frame devises by wrapping the end of each longitudinal restraint strap or hoop restraint strap around a clevis roller 532, as shown in FIG. 33, and sewing it back on itself via a high efficiency seam 520, as discussed above.

The structural restraint straps 690 as shown in FIG. 33 may be woven with perpendicular restraint straps on the top portion 692 of the loop that is formed from wrapping the strap 694 around the roller 532. The structural restraint straps may be woven in this fashion until they are adjacent the roller 532. At this point, these structural restraint straps 690 may pass on top of the clevis 656. As shown in FIG. 33, these structural restraint straps 690 that pass on top of the frame devises 656 are connected to the rigid frame 654 with a restraint buffer assembly 670. The restraint buffer assembly 670 may be comprised of a protective buffer layer 674, such as silicone, that is sandwiched and bonded between two layers of a protective fabric layer 676, such as Kevlar fabric. The fixed end of the buffer layer 674 may be secured to the frame by an adhesive bond or other securing mechanism 675. The outermost fabric layer 676 may have several weave locking straps 678 sewn, bonded or otherwise attached to it. The structural restraint straps 690 that pass on top of the structural pass-through frame may be woven into these weave locking straps 678, and may be locked in place by using a series of fastening stitches 522.

A series of dummy straps 680 may be woven along the bottom portion 693 of the loop that is formed from wrapping the strap 694 around the roller 532, as shown in FIG. 33. The dummy straps 680 may be approximately as long as the structural pass-through frame 654, and may be stitched or otherwise interconnected to the bottom portion 693 of the straps. While these straps 680 are not loaded, they do provide a continuous back wall for the bladder 600 to press against, thereby preventing the inflated bladder from penetrating through the bottom portion of the strap loop.

MMOD Layers and Layer Attachment

Referring now to FIG. 34, the flexible shell includes an outer Atomic Oxygen (AO) protective cover 512, a deployment system layer 514, a Multi-Layer Insulation Layer (MLI) 516, the various MMOD layers 518 and restraint layer 500. The MMOD layers are generally puncture resistant layers, which resist puncture of the interior layers, and particularly the bladder or bladder layers, by objects impacting the shell, such as projectiles. When used in space applications, these layers 518 thus resist puncture from projectiles including micro-meteroid and/or orbital debris. Not shown in FIG. 34 are the various layers of the flexible bladder and the inner liner which are provided inboard of the restraint layer. The AO layer 512 is separated from the MLI layer 576 by the deployment layer 514. The v-tabs 534 extend through layer 512, but only the cords 570 extend through layer 516, so that the thermal performance of the MLI layer is not reduced by holes for receiving the v-tabs 534. Multiple Micro-meteoroid and Orbit Debris (MMOD) layers 518, with foam layers 520 therebetween, are spaced between the MLI layer 516 and the restraint layer 500.

FIG. 34 depicts attachment cord 570A and a circumferentially spaced attachment cord 570B, with a deployment gore 524 as shown in FIG. 21 spaced between these cords. A portion of another gore 562 is shown to the right of the cord 570B. A series of selectively spaced cords 580, each spaced substantially along a gore seam 625 as shown in FIG. 21, may be provided between each of the vessel gores. A crimp 582 and a washer 584 may be provided on each side of each MMOD layer to position each layer along the length of the cords. The MMOD shield as shown in FIG. 34 consists of five shielding layers 518A, 518B, 518C, 518D and 518E, each preferably formed of a ceramic fabric, such as a Nextel fabric, and separated by a low density polyurethane foam 520 contained in individual bags 521 spaced in each gore and between two cords 570. After the foam is placed inside each bag, a vacuum is pulled prior to installation to reduce the thickness of the foam layers. The function of the expanded foam layers when deployed is to provide separation for the shielding layers 518. The MMOD bags are thus independent of other components, and may be vented to prevent billowing after launch to release ascent loads. When in orbit, the vacuum in the bags will equalize with the vacuum in space, and the resilience of the foam will position the MMOD layers at the proper spacing between layers.

A significant advantage of this system is the ease of manufacturing and repeatability compared to systems wherein the foam is not provided in individual bags.

The inboard end of each cord 570 may be attached to the flexible structural restraint layer 500, preferably by wrapping the cord 570 around one or more straps of the restraint layer, then securing the cord end to the same cord. A crimp or a knot 582 in the end of the cord after it passes through the restraint layer 500 may be used to secure the cord end. Along the length of each cord 580, similar crimps or knots 582 may be used to space washers 584 which contact the respective MMOD shielding layers 518. The crimps or knots 582 position the MMOD layers 578 within the thickness of the inflated shell.

Each shielding layer 518 is fabricated with a width slightly greater than one gore, so that each layer extends between and on opposing sides of two adjacent circumferential cords. The layers 518 thus overlap slightly in the area adjacent each cord. The separated layers 518 are held in place by the washers, which are held in place by the crimps or knots in the cords. This attachment mechanism provides ease in manufacturing. Only a hole sufficiently large for the cords 580 need be formed in the MLI layers 516. The MMOD layer 518 in one gore is positioned with respect to the MMOD layer in an adjacent gore by a series of cords 580 which pass through both layers where the MMOD layers overlap. The various layers 518 in each gore are held in their spaced position by the foam layers 520 in each gore. This gore-to-gore and layer-to-layer design reduces the weight of the shell, and allows all structural loads to be transmitted back to the restraint layer 500. The outer loop 586 is preferably provided at the outboard of each cord 580 to assist in folding the shell layers to reduce the vessel size for storage or transport. Forces applied to this loop 586 are transmitted by the cord 580 to the restraint layer 500.

The MLI insulation layer 516 as shown in FIG. 34 is thus separate from the AO layer 512, and the deployment system layer 514 is spaced between these layers. The v-tabs 534 of the deployment system discussed subsequently may be sewn to a stiff and strong fabric layer, such as deployment layer 514. The MLI layer may then be placed on the interior side of the deployment system layer, with the AO layer placed outboard of the deployment system layer. FIG. 34 depicts the v-tabs 534 of the deployment system exposed through the protective AO layer. This design minimizes penetrations through the MLI layers in order to minimize heat leaks, since each cord 580 only penetrates a small aperture provided in each layer 518. Small plates 588 may be provided outboard of AO layer 512 and inboard of MLI layer 516. The MLI and AO layers may thus be separated by the deployment system layer, and are preferably oversized with respect to the deployment system layer and therefore do not experience any significant loading. While FIG. 34 shows the deployment system layer 514 interior of the AO layer, alternatively the deployment system straps discussed subsequently could be sewn directly to the exterior of a sufficiently strong AO layer.

The fabric of the MMOD layers, which may be a Nextel material, is preferably coated with a thin polyethylene film prior to assembly. This facilitates ease in manufacturing since the material is easier to handle (increased shear integrity of weave, with less fraying of the edges). The coated material is also easier to cut and provides increased manufacturing tolerances. The polyethylene film coating also minimizes airborne particles during manufacturing, thereby minimizing hazardous environments. The polyethylene coating also minimizes outgassing concerns of Nextel to reduce contamination and provides increased radiation benefit due to adding additional polyethylene layers.

Deployment System

While there are multiple options for deployment, the embodiment detailed in this section is designed for deployment in environments where manual deployment is not practical. In these situations, it is desirable to deploy remotely by actuating at single or as few cut locations as possible.

Figure 35:
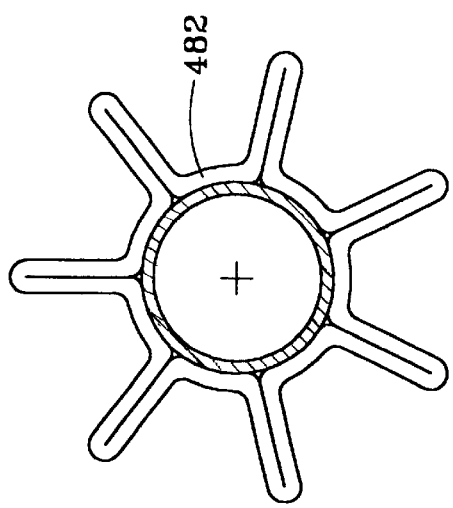

FIG. 21 illustrates a preferred embodiment of a deployed module system according to the present invention. The depicted module utilizes a relatively simple yet highly efficient technique to fold or deploy the system, as shown in FIGS. 35 and 36, and may be used when the shell includes a restraint layer and either single or multiple bladder layers. A suitable module when deployed may have a generally cylindrical configuration, as depicted in FIG. 21. The deployment system includes support straps 522, as described subsequently, which may be provided for every third gore, thereby making those deployment strap gores 524. Each gore 524 thus has a plurality of axially spaced deployment straps 522 along its length.

To obtain the reduced size or transport configuration, the un-inflated module may first be folded to the configuration shown in FIG. 35. Referring to FIG. 21, the gores circumferentially surrounding the upper tunnel may be consecutively numbered with the 1, 2, 3, scenario. Each gore has a hinge line 525 on each side for enabling folding of each gore with respect to an adjoining gore. As shown in FIG. 35, every third gore may be pushed inward toward the central core. Adjacent gores are thus folded in such a manner that the inner surfaces of the folded fabric layers are placed side by side. These two side by side gores thus form one of the radially outward spokes of the shell depicted in FIG. 35.

As shown in FIG. 36, adjacent gores are folded over so that the ends of one gore line up with the start of the adjacent gore. Each pair of shell gores may thus fold over, as shown in FIG. 36, thereby depicting a folding scenario, and logically also unfolding the scenario. As depicted in FIG. 36, the outermost of the three stacked gores are the deployment gores.

Prior to folding and during the manufacturing process, rings or v-tabs 534 as shown in FIG. 34 may be provided on every deployment gore. These v-tabs may be sewn on deployment layer 514 at selected longitudinal spacings, such that the tabs 534 on adjacent folded gores line up. The restraint layer 500, or other shell layers, may serve as the deployment layer 754, depending on the environment in which the vessel is used. For example, the restraint layer 500 thus may serve as the deployment layer if MMOD and MLI layers are not required.

Figure 37:
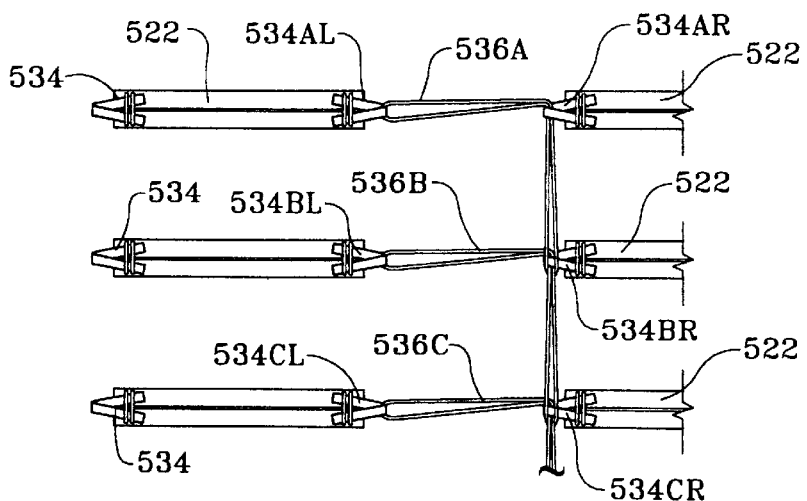
FIG. 37 is a simplified side view of a portion of a deployment system according to the present invention.

As shown in FIG. 37, the deployment system may include multiple loop after v-tab mechanisms 534 which are vertically aligned on each deployment gore when the module is positioned as shown in FIG. 21. An attachment strip 522 may be secured by stitching or other techniques to a deployment system layer 514, as shown in FIG. 34. Each v-shaped tab 534 may be attached to and extend from an end portion of the strip 522.

Once the deployment gores are folded to the position as shown in FIG. 36, a first deployment cord 536A may then be looped through a v-tab 534AL at the uppermost end of a deployment gore, then the opposite end of the cord 536A passed through an adjacent v-tab 534AR, then pulled downward to pull the v-tabs and thus the gores attached thereto together. In a similar operation, a second cord 536B may be looped through to the next lower v-tab 534bl, then the looped cord passed through the v-tab 534BR, then passed through the loop at the end of cord 534A, then pulled downward to pull the v-tabs 534BL and 534BR together, and also maintaining the cord 536A tout. The next lower v-tab 534CL is similarly connected to cord 536C, which is passed through v-tab 534CR then through the loop at the end of cord 536B, then pulled downward. In a similar manner, all the v-tabs of the adjacent deployment gores may be held together. A series of cords 536 which hold the length of two gores together prior to deployment may be considered a daisy chain. The last cord 536X of the daisy chain may then be tied off to the structural core. Each of the circumferentially spaced deployment gores may be pulled together by the series of cords 536, thereby forming a daisy chain of cords between adjacent deployment gores.

The daisy chain configuration of cords as discussed above substantially increases the reliability compared to systems which would attempt to use a single cord to tie together a series of v-tabs between the gores. This system also allows two gores to be released from a single cut location by cutting the last cord 536X. When cord 536X is cut, that action allows the cord held taut by the 536X cord to be released, and that releasing action in turn releases the next cord so that the series of deployment cords are released from the single cut location. The length of each deployment cord 536 is relatively short, which reduces the frictional engagement of that cord with the components which contact that cord.

The deployment system thus restrains the folded shell layers prior to deployment. A series of deployment straps 522, as shown in FIGS. 21 and 37, span every third gore and position a v-tab 534 at each end of the strap. In a suitable embodiment as shown in FIG. 21, the module may comprise seven deployment gores, and thus there could be seven knives to make the seven independent cuts of the cords 536X at the ends of the seven daisy chains to release the gores prior to inflation.

As shown in FIG. 21, a series of deployment straps 522 may be sewn to the deployment layer 514 of each deployment gore, with the v-tabs 534 sewn to the opposite ends of each strap 522. When the gores are folded and all deployment cords 536 have been installed in the daisy chain manner, the deployment straps 522 and the cords 536 fully contain the folded assembly. The v-tabs 534 or other ring-type component alternatively may be attached directly to the deployment layer or other supporting layer of the shell. Attachment mechanisms other than strap 522 may be used.

Figure 38:
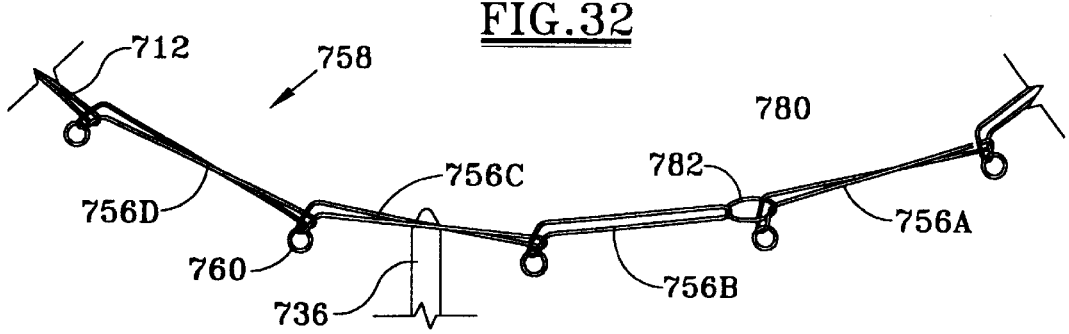
FIG. 38 is a simplified end view of a portion of an alternative deployment system including a circumferential daisy chain featuring a single cut location.

FIG. 38 is a top view of a portion of an alternate deployment system according to the present invention which also uses the cords 536 discussed above. In this embodiment, another series of daisy chain cords circumferentially encircle the deflated gores. Only a portion of the circular shaped daisy chain cords are depicted. This alternate embodiment includes adding additional circumferentially arranged daisy chain cords 756 that would free all the circumferential cords 536X and thus all the gores in series for deployment from a single release location. Each of the last circumferentially spaced cords 536X may be looped around one of the cords 756, as shown in FIG. 38. Although multiple cutters or a single cutter moved to multiple locations may be used to form multiple cuts in the daisy chains of cords 536, this embodiment illustrates that a single cut location may be provided for releasing the entire daisy chain assembly.

FIG. 38 depicts circumferential deployment cords 756 each looped around a tab or ring 760, which in turn is secured to a side of each deployment gore. The cords 756 are laced together in a manner of daisy chain 758. The end of each cord opposite ring 760 is passed through the end of the next cord near its ring 760, and is held in that position by the next cord. As shown in FIG. 38, a small additional loop 782 may hold together cord 756A and 756B. When loop 782 is cut, each set of cords starting with cord 756B will be released. The tension in cord 756C will thus allow the free end of cord 756B to pull out from the cord 756C, thereby releasing cord 756C, which in a similar manner then releases cord 756D. Each of the circumferentially arranged cords will thus be released in the manner of a daisy chain assembly until the last released cord releases the cord 756A. FIG. 38 also depicts one of the deployment cords 736X looped around the cord 756C. When cord 756C is released, cord 736X is released. In the same manner, each of the circumferentially spaced cords 736X may be released, which then releases the series of cords 736 which are held in place by each of the cords 736X. A single "cut" may be made using a suitable cutting device, such as pyrotechnic guillotine pencil cutters 780. It may be desirable to include a pair of cutters at each cut location to provide redundancy. Other conventional mechanisms may be used to cut the daisy chain for other applications, such as those discussed herein.

As indicated above, the vessel of the present invention may be used as a habitation module for storage for vehicles in either space or on planetary bodies. The vessel may also be used as an inflatable hyperbaric chamber/airlock, flotation/stabilization devices for offshore platforms, and habitation modules for use in harsh environments. The vessel may be used for large space stations that require minimal on-orbit assembly or may be used as a deployable habitat in remote locations on Earth. The vessel may alternatively be used as a space hotel, an inflatable rover for use on planetary bodies, as a storage and/or supply module for space stations, or as a large space station that may rotate to produce artificial gravity. In addition to being used as a habitat in humans in space applications, the vessel may be a habitat on any planetary body, including the earth. A hybrid inflatable vessel is able to withstand high stress, and could be used as a pressurized vessel to store various solids, liquids, and/or gases. The unit has been tested to withstand an exterior environment of water, air, or a vacuum.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

For the purpose of this application, the term "flexible shell" is synonymous with the term "inflatable shell".

What is claimed is:

1. An inflatable module, comprising:
   one or more rigid structural pass through frames;
   an inflatable shell including a flexible structural restraint layer secured to each of the one or more rigid structural pass through frames and a bladder sealingly attached to each of the one or more rigid structural pass through frames;
   the flexible restraint layer comprising interwoven elongate longitudinal straps and hoop straps; and
   the inflatable shell having a pre-deployment configuration in which the inflatable shell is collapsed and deflated, and a deployed configuration in which the inflatable shell is inflated and defines an enclosed space interior to the inflated shell.

2. A module as claimed in claim 1, wherein the longitudinal straps and the hoop straps are fixedly connected by a plurality of fastening devices at selectively spaced longitudinal intervals and hoop intervals.

3. A module as claimed in claim 2, wherein each of the plurality of fastening devices is a stitch interconnecting a longitudinal strap with a hoop strap.

4. A module as claimed in claim 3, wherein a series of stitches form both longitudinal seams and hoop seams.

5. A module as claimed in claim 1, wherein a stitch connects a longitudinal strap with one of an end of the longitudinal strap and another longitudinal strap.

6. A module as claimed in claim 5, wherein the stitch connects the longitudinal strap with the end of the longitudinal strap, and the stitch has a gradually reduced distance between successive rows of the stitch approaching the end of the longitudinal strap.

7. A module as claimed in claim 5, wherein the stitch has a maximum yield load less than the yield load of the longitudinal strap, such that the stitch breaks away before breaking the longitudinal strap.

8. A module as claimed in claim 5, wherein the stitch connects a longitudinal strap with the another longitudinal strap, and a spacing between successive rows of the stitch gradually reduces between each end of the stitch and a center portion of the stitch.

9. A module as defined in claim 1, wherein the bladder includes multiple bladder layers each individually bonded to each of the one or more rigid structural pass through frames.

10. A module as claimed in claim 1, further comprising:
    a structural core having longitudinally spaced ends; and
    two adjacent longitudinal straps form a single loop attached to each of the longitudinally spaced ends.

11. A module as claimed in claim 10, wherein each end of the single loop is wrapped around a roller secured to one of the longitudinally spaced ends.

12. A module as claimed in claim 11, further comprising:
    a clevice attached to each of the longitudinally spaced ends; and
    the roller is rotatably mounted to the clevice.

13. A module as claimed in claim 1, wherein the bladder includes two or more bladder layers, and a first bladder layer is secured to a second bladder layer at selected intervals by a plurality of fastening devices.

14. A module as recited in claim 13, wherein each of the plurality of fastening devices comprise:
    a first bladder fastening patch secured to the first bladder layer;
    a second bladder fastening patch secured to the second bladder layer; and
    a connector securing together the first and second bladder fastening patches.

15. A module as claimed in claim 14, wherein at least one of the first and second bladder fastening patches is a weak link in the fastening device for failure prior to failure of either one of the first and second bladder layers.

16. A module as claimed in claim 13, wherein each of the plurality of fastening devices comprises a fastening patch bonded to each of the first bladder layer and the second bladder layer by an adhesive.

17. A module as claimed in claim 13, wherein each of the plurality of fastening devices comprise a bladder fastening patch formed from a felt pad material.

18. A module as claimed in claim 1, wherein the bladder comprises one or more layers and an outermost layer of the bladder is secured to the restraint layer at selected intervals by a plurality of fastening devices.

19. A module as claimed in claim 18, wherein a portion of each of the fastening devices extends through the restraint layer to secure the fastening device to the restraint layer.

20. A module as claimed in claim 18, wherein the bladder fastening patch is bonded to an outermost layer of the bladder with an adhesive.

21. An inflatable module, comprising:
    a structural core;
    an inflatable shell including a plurality of circumferentially spaced gores each sealingly attached to the structural core; and
    a deployment system for releasing the inflatable shell from a pre-deployment configuration in which the inflatable shell is collapsed, deflated, and folded around the structural core to a deployed configuration in which the inflatable shell is inflated and surrounds the structural core thereby defining an enclosed space interior to the inflated shell, the deployment system including a first gore connector secured to a first gore, a second gore connector secured to a second gore circumferentially spaced from the first gore by at least one intermediate gore when the shell is inflated, and a flexible deployment member interconnecting the first gore connector and the second gore connector when in the pre-deployment configuration, such that the elongate flexible deployment member may be released to allow separation of the first gore from the second gore when the shell is inflated.

22. A module as claimed in claim 21, wherein a plurality of first gore connectors are each secured to the first gore, a corresponding plurality of second gore connectors are each secured to the second gore, and a corresponding plurality of flexible deployment members each connects a respective first gore connector to a respective second gore connector when in the pre-deployment configuration and releases the respective first gore connector for separation from the respective second gore connector when the inflatable shell is inflated.

23. A module as claimed in claim 22, wherein each of the flexible deployment members includes a cord which is released prior to completing inflation of the inflatable shell, and the cord is released by release of a release initiation cord.

24. A module as claimed in claim 23, wherein each of the plurality of cords connects the first gore and the second gore and an end of another of the plurality of cords, and the release initiation cord, upon release, sequentially releases each of the plurality of cords.

25. A module as claimed in claim 21, wherein the shell, when collapsed, deflated, and folded around the structural core, forms an intermediate gore layer inward of each of the first gore and second gore, and an interior gore layer inward of the intermediate gore layer.

26. A module as claimed in claim 21, further comprising:
a plurality of circumferentially spaced cords forming a chain surrounding the collapsed and deflated shell, each cord being attached to a circumferential attachment location on the collapsed and deflated shell and another of the plurality of circumferentially spaced cords, such that a break in one of the circumferentially spaced cords forming the chain releases each of the plurality of the circumferentially spaced cords and the elongate flexible deployment member connecting the first gore and the second gore.

27. A module as claimed in claim 26, further comprising:
a powered cutter for forming a break in the one of the circumferentially spaced cords.

28. A module as claimed in claim 21, further comprising:
a first flexible strap connecting the first gore connector to a deployment layer;
a second flexible strap connecting the second gore connector to the deployment layer; and
a plurality of cables each connecting the deployment layer to a structural restraint layer of the inflatable shell, the structural restraint layer being secured to the structural core and carrying substantially all structural loads on the inflatable shell.

29. A module as claimed in claim 21, wherein the inflatable shell comprises a plurality of circumferentially spaced gores each connected at opposing ends to the structural core, each of the plurality of gores having a hinge on each side for enabling folding of each gore with respect to adjoining gores.

30. A module as claimed in claim 29, wherein two circumferentially spaced gores are positioned between the first gore and the second gore.

31. An inflatable shell for a module, the shell having a pre-deployment configuration in which the shell is collapsed and deflated, and a deployed configuration in which the shell is inflated and has a deployed thickness, the shell comprising:
a plurality of circumferentially spaced gores, each gore having a hinge on each side for enabling folding with respect to an adjoining gore;
a plurality of layers within the inflatable shell, each layer being spaced in a direction of the deployed thickness from other of the plurality of layers when the shell is inflated; and
a plurality of flexible cables each connecting the plurality of spaced apart layers when the shell is inflated, each of the plurality of cables including a plurality of stops along a length of the cable for positioning of the spaced apart layers when the shell is inflated.

32. An inflatable shell as defined in claim 31, wherein each of the plurality of cables is positioned along a respective gore hinge.

33. An inflatable shell as claimed in claim 31, wherein each of the plurality of layers comprises layer segments overlapping a respective cable, such that the cable positions one layer segment relative to another layer segment when the shell is inflated.

34. An inflatable shell as claimed in claim 33, wherein each layer segment rotates with respect to an overlapping layer segment about the cord when the shell is inflated.

35. An inflatable shell as claimed in claim 31, further comprising:
each of the plurality of layers comprise a micro-meteoroid and orbit debris layer; and
a plurality of foam layers each spaced between two spaced apart layers, each of the plurality of foam layers comprising a foam bag spaced in one of the plurality of gores.

36. An inflatable shell as claimed in claim 35, wherein a vacuum in each foam bag reduces spacing between the layers when the shell is collapsed and deflated.

37. An inflatable module, comprising:
a rigid structural core;
an inflatable shell including a flexible structural restraint layer secured to the rigid core and a bladder sealingly attached to the rigid core;
the bladder being sealed to the rigid structural core and being oversized with respect to the restraint layer such that a load applied to the inflatable shell is absorbed by the restraint layer and the structural core, and no significant load is transmitted through the bladder to the rigid core; and
the flexible restraint layer comprising interwoven elongate longitudinal straps and hoop straps, two adjacent longitudinal straps forming a single loop adjacent similar single loops, each loop being held at each end thereof by a roller secured to and rotatable about the rigid structural core.

38. An inflatable module as claimed in claim 37, wherein the bladder comprises two or more bladder layers, and two or more seals each for separately sealing a respective bladder layer to the rigid structural core.

39. An inflatable module as claimed in claim 37, further comprising:
a peel guard secured to the rigid structural core for supporting the bladder to maintain the bladder sealed to the rigid structural core during handling and assembly of the module.

40. An inflatable module as claimed in claim 37, wherein the rigid structural core includes a plurality of devices each for supporting a respective roller.

41. An inflatable shell for a module, the shell having a pre-deployment configuration in which the shell is collapsed and deflated and a deployed configuration in which the shell is inflated, the shell comprising:

an insulation layer;

a deployment layer spaced exteriorly of the insulation layer;

a bladder spaced oppositely of the deployment layer with respect to the insulation layer; and a plurality of deployment members, each secured to the deployment layer for maintaining the shell in the pre-deployment configuration and selectively releasing the shell from the pre-deployment configuration.

42. A shell as claimed in claim 41, further comprising:

a plurality of puncture resistant layers each spaced between the insulation layer and the bladder for protecting the bladder from projectiles.

43. A shell as claimed in claim 42, further comprising:

a plurality of foam layers, each foam layer spaced between two of the puncture resistant layers; and each of the plurality of foam layers comprising a plurality of foam bags each spaced in one of a plurality of shell gores.

44. A shell as claimed in claim 42, wherein a plurality of cables each extend through each of the plurality of puncture resistant layers and between a flexible structural restraint layer and the insulation layer.

45. A shell as claimed in claim 44, wherein each of the plurality of puncture resistant layers comprises circumferentially spaced layers which each extend between shell gores and overlap a respective one of the plurality of cables.

46. An inflatable module, comprising:

a rigid shell pass through frame;

an inflatable shell including a flexible structural restraint layer secured to the rigid pass through frame and a bladder sealingly attached to the rigid pass through frame;

the flexible restraint layer comprising interwoven elongate longitudinal straps and hoop straps;

the bladder being sealed to the pass through frame and being oversized with respect to the restraint layer such that a load applied to the flexible shell is absorbed by the restraint layer and the structural core, and no significant load is transmitted through the bladder;

a plurality of rollers each attached to the pass through frame for supporting a respective longitudinal strap passed around the respective roller; and a securing member for securing an end of each longitudinal strap passed around the roller to the longitudinal strap.

47. An inflatable module as claimed in claim 46, wherein each longitudinal strap passed around the respective roller is unwoven from hoop straps which are connected to the shell pass through frame.

48. An inflatable module as claimed in claim 47, further comprising:

a protective buffer layer secured to the pass through frame;

a plurality of locking straps secured to the protective buffer layer; and the unwoven hoop straps are interwoven with the locking straps.

49. An inflatable module as claimed in claim 46, further comprising:

a plurality of dummy straps interwoven with a portion of each of the plurality of longitudinal straps extending from the roller to the securing member for preventing the bladder from penetrating between adjacent longitudinal straps.

50. A method of releasing an inflatable shell including a plurality of circumferentially spaced gores each sealingly attached to a structural core and adjoining gores, the shell being released from a pre-deployment configuration in which the shell is collapsed, deflated, and folded around the structural core to a deployed configuration in which the inflatable shell is inflated and surrounds the structural core thereby defining an enclosed space interior to the inflated shell, the method comprising:

radially moving selected ones of a plurality of gores inward against the structural core;

positioning one or more other gores radially outward of each inward gore;

interconnecting a first radially outward gore with a second radially outward gore with a plurality of elongate flexible deployment members; and releasing the plurality of elongate flexible deployment members to release and separate the first radially outward gore from the second radially outward gore.

51. A method as claimed in claim 50, further comprising:

maintaining each of the plurality of elongate flexible deployment members taut by another of the plurality of elongate flexible deployment members;

securing one of the plurality of elongate flexible deployment members to maintain each of the other of the plurality of elongate flexible members and the first and second radially outward gores in the pre-deployment configuration; and releasing the one of the plurality of elongate flexible deployment members which in turn sequentially releases each of the plurality of elongate flexible deployment members, thereby releasing the first radially outward gore for separation from the second radially outward gore prior to inflating the shell.

52. The method as claimed in claim 51, further comprising:

forming a chain of cords each spaced circumferentially about the shell wherein the pre-deployment configuration;

connecting the one of the plurality of elongate flexible deployment members to the chain; and releasing the chain to release the one of the plurality of elongate flexible deployment members.

* * * * *